US006214757B1

(12) United States Patent
Schwartz et al.

(10) Patent No.: US 6,214,757 B1
(45) Date of Patent: Apr. 10, 2001

(54) SOLID STATE OXYGEN ANION AND ELECTRON MEDIATING MEMBRANE AND CATALYTIC MEMBRANE REACTORS CONTAINING THEM

(75) Inventors: Michael Schwartz; James H. White; Anthony F. Sammells, all of Boulder, CO (US)

(73) Assignee: Eltron Research, Inc., Boulder, CO (US)

( * ) Notice: Subject to any disclaimer, the term of this patent is extended or adjusted under 35 U.S.C. 154(b) by 0 days.

(21) Appl. No.: 09/412,997

(22) Filed: Oct. 5, 1999

Related U.S. Application Data

(60) Division of application No. 08/639,781, filed on Apr. 29, 1996, now Pat. No. 6,033,632, which is a continuation-in-part of application No. 08/163,620, filed on Dec. 8, 1993, now abandoned.

(51) Int. Cl.[7] ............................... C07C 2/04; B01J 21/10
(52) U.S. Cl. ............................... 502/4; 502/302; 502/303; 502/304; 502/305; 502/306; 502/308; 502/309; 502/311; 502/325; 502/326; 502/328; 95/56; 585/520; 210/763; 210/510.1; 210/500.25
(58) Field of Search ............................... 210/500.25, 502.1, 210/510.1, 763; 95/56; 422/190, 191, 222; 502/4, 60, 302–311, 325, 328; 585/520

(56) References Cited

U.S. PATENT DOCUMENTS

| 3,607,863 | 9/1971 | Dosch | 260/209 |
|---|---|---|---|
| 3,754,951 | 8/1973 | Coatney | 106/58 |
| 4,083,730 | 4/1978 | Kwech et al. | 106/89 |
| 4,330,633 | 5/1982 | Yoshisato et al. | 501/152 |
| 4,791,079 | 12/1988 | Hazbun | 504/4 |
| 4,793,904 | 12/1988 | Mazanec et al. | 204/59 |
| 4,802,958 | 2/1989 | Mazanec et al. | 204/80 |
| 4,827,071 | 5/1989 | Hazbun | 585/443 |
| 4,933,054 | 6/1990 | Mazanec et al. | 204/80 |
| 5,160,618 | 11/1992 | Burggraaf et al. | 210/500.25 |
| 5,160,713 | 11/1992 | Mazanec et al. | 423/210 |
| 5,210,059 | 5/1993 | Matturo et al. | 502/4 |
| 5,240,480 | 8/1993 | Thorogood et al. | 96/4 |
| 5,306,411 | 4/1994 | Mazanec et al. | 204/266 |
| 5,356,728 | 10/1994 | Balachandran et al. | 429/8 |
| 5,366,712 | 11/1994 | Violante et al. | 423/248 |
| 5,393,325 | 2/1995 | Edlund | 95/56 |
| 5,397,541 | 3/1995 | Post | 422/88 |
| 5,430,209 | 7/1995 | Agaskar et al. | 585/315 |
| 5,466,646 | 11/1995 | Moser | 502/60 |
| 5,591,315 | 1/1997 | Mazanec et al. | 205/462 |
| 5,639,437 | 6/1997 | Balachandran et al. | 423/593 |
| 5,648,304 | 7/1997 | Mazanec et al. | 501/134 |

(List continued on next page.)

FOREIGN PATENT DOCUMENTS

| 399 833 | 11/1990 | (EP) . |
| 673 675 | 9/1995 | (EP) . |
| 705 790 | 4/1996 | (EP) . |
| 766 330 | 4/1997 | (EP) . |
| 438 902 | 5/1997 | (EP) . |
| 2203446 | 3/1988 | (GB) . |
| 94/24065 | 10/1994 | (WO) . |

OTHER PUBLICATIONS

Teraoka et al. (1988) Mat. Res. Bull. 23:51–58.
Teraoka et al. (1985) Chem. Lett. 1743–1746.
Teraoka et al. (1988) Chem. Lett. 503–506.
Matsumoto et al. (1980) J. Electrochem. Soc. 127(11):2360–2364.

(List continued on next page.)

*Primary Examiner*—Chester T. Barry
(74) *Attorney, Agent, or Firm*—Greenlee, Winner and Sullivan, P.C.

(57) ABSTRACT

A process for production of synthesis gas employing a catalytic membrane reactor wherein the membrane comprises a mixed metal oxide material.

62 Claims, 11 Drawing Sheets

U.S. PATENT DOCUMENTS

| | | | |
|---|---|---|---|
| 5,693,212 | 12/1997 | Mazanec et al. | 205/462 |
| 5,702,999 | 12/1997 | Mazanec et al. | 501/152 |
| 5,714,091 | 2/1998 | Mazanec et al. | 252/373 |
| 5,723,035 | 3/1998 | Mazanec et al. | 204/295 |
| 5,744,015 | 4/1998 | Mazanec et al. | 204/295 |
| 5,779,904 | 7/1998 | Ruderman et al. | 210/500.25 |
| 5,788,748 | 8/1998 | Mazanec et al. | 96/4 |
| 5,821,185 | 10/1998 | White et al. | 502/4 |

OTHER PUBLICATIONS

Goodenough et al. (1990) Solid State Ionics 44:21–31.

Zhen, Y.S. and Goodenough, J.B. (1990) Mat. Res. Bull. 25:785–790.

Gallagher et al. (1964) J. Chem. Phys. 41(8):2429–2434.

Greaves et al. (1975) Acta Cryst. B31:641–646.

Sammells et al. (1992) Solid State Ionics 52:111–123.

Cook, R.L. and Sammells, A.F. (1991) Solid State Ionics 45:311–321.

Cook et al. (1990) J. Electrochem. Soc. 137:3309–3310.

Teraoka et al. (1985) Chem. Lett. 1367–1370.

Crespin, M. and Hall, K.W. (1981) J. Catal. 69:359–370.

Chick et al. (1990) Mater. Lett. 10(1,2):6–12.

Pederson et al. (1991) Mater. Lett. 10(9,10):437–443.

van der Pauw (1958) Philips Res. Rep. 13(1):1–9.

Rostrup–Nielson, J.R. and Bak Hansen, J.–H. (1993) J. Catalysis 144:38–39.

Sammells, T., (1991), "Rational Selection of Perovskites for Solid Electrolytes and Electrocatalysis," Presented at BP America Research, Warrenville Research Center, Sep. 16, 1991, 46pp.

Pujare, N U and Sammells, A.F. (1988) J. Electrochem. Soc. 135(10):2544–2545.

Shin, S. and Yonemura, M. (1978) Mat. Res. Bull. 13:1017–1021.

Teraoka, Y. et al. (1989) J. Ceram. Soc. Jpn. Inter. Ed. 97:458–462.

Teraoka, Y. et al. (1989) J. Ceram. Soc. Jpn. Inter. Ed. 97:523–529.

Kuchynka, D.J. et al. (1991) J. Electrochem. Soc. 138(5):1284–1299.

Sammells, A.F. and Cook, R.L. (1991), "Rational Selection of Advanced Solid Electrolytes for Intermediate Temperature Fuel Cells," presented at the Ceramic Conductors for Solid–State Electrochemical Devices Meeting, May 12–15, 1991, Snowbird, UT, (abstract only).

Sammells, A.F. et al. (1992) Solid State Ionics 52:111–123.

Cook, R.L. et al. (1990) J. Electrochem. Soc. 137(10):3309–3310.

Schwartz, M. et al. (1993) J. Electrochem. Soc. 140(4):L62–L63 (Apr.).

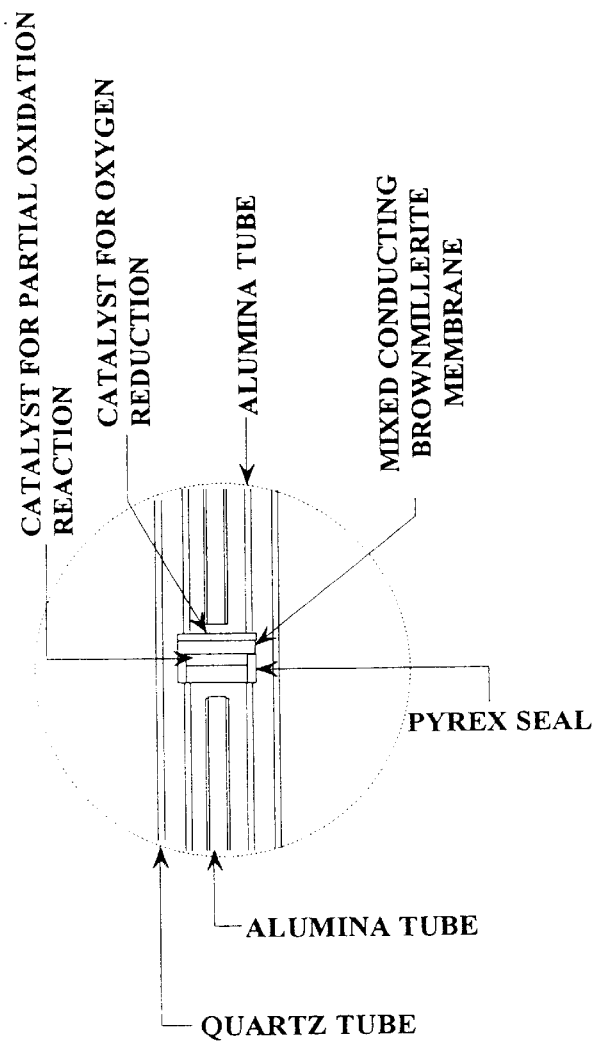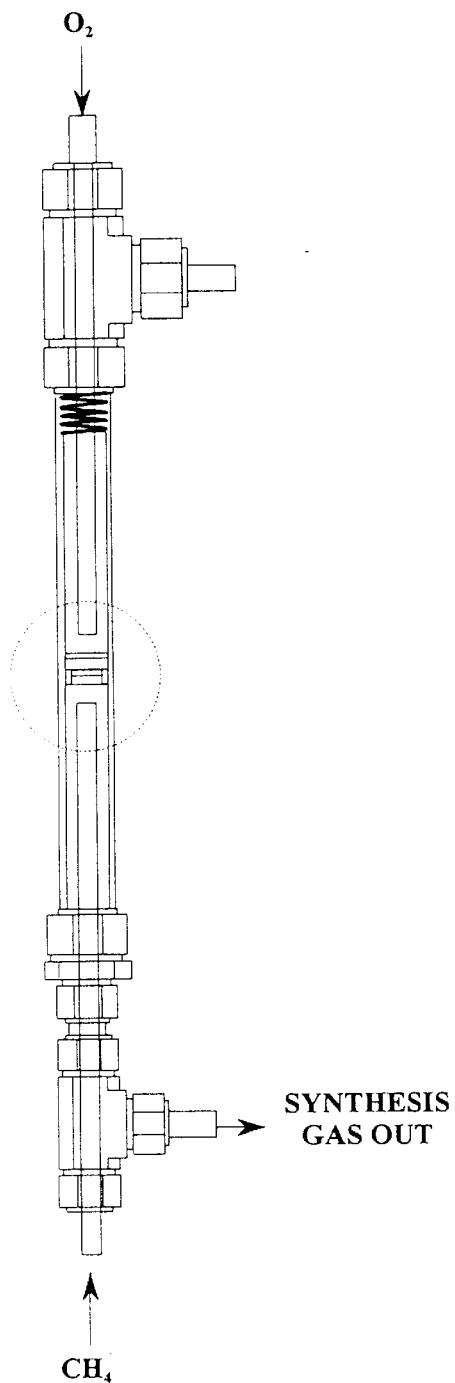
Fig. 10B
Fig. 10A

SOLID STATE OXYGEN ANION AND ELECTRON MEDIATING MEMBRANE AND CATALYTIC MEMBRANE REACTORS CONTAINING THEM

CROSS-REFERENCE TO RELATED APPLICATIONS

This application is a division of U.S. patent application Ser. No. 08/639,781, filed Apr. 29, 1996, now U.S. Pat. No. 6,033,632, which is a continuation-in-part of U.S. patent application Ser. No. 08/163,620, filed Dec. 8, 1993, now abandoned, all of which are incorporated in their entirety by reference herein.

This invention was made with government support under Contract No. DE-FG02-90ER81046, awarded by the Department of Energy.

FIELD OF THE INVENTION

This invention relates to gas-impermeable, solid state materials fabricated into membranes for use in catalytic membrane reactors and more particularly to solid state oxygen anion- and electron-mediating membranes for use in catalytic membrane reactors for promoting partial or full oxidation of different chemical species, for decomposition of oxygen-containing species and for separation of oxygen from other gases. Solid state materials for use in the membranes of this invention include mixed metal oxide compounds having the brownmillerite crystal structure. Catalytic membrane reactions include, among others, the partial oxidation of methane or natural gas to synthesis gas.

BACKGROUND OF THE INVENTION

Catalytic membrane reactors using solid state membranes for the oxidation or decomposition of various chemical species have been studied and used previously. One potentially valuable use of such reactors is in the production of synthesis gas. See, for example, Cable et al. EP patent application 90305684.4 (published Nov. 28, 1990) and Mazanec et al. U.S. Pat. No. 5,306,411.

Synthesis gas, a mixture of CO and $H_2$, is widely used as a feedstock in the chemical industry for production of bulk chemicals such as methanol, liquid fuel oxygenates and gasoline. Synthesis gas is currently produced from natural gas, i.e. methane, or other light hydrocarbons by steam reforming. In this technique, natural gas is mixed with steam and heated to high temperatures, and the heated mixture is passed over a catalyst, such as Ni on $Al_2O_3$, to form synthesis gas which is then collected. Steam reforming has two major disadvantages. First, the chemical reaction to produce CO and $H_2$ from steam ($H_2O$) and natural gas ($CH_4$) is endothermic, i.e. the reaction requires energy. Roughly one third of the natural gas consumed in the steam reforming process goes to produce heat to drive the reaction, rather than to produce CO and $H_2$. Second, the ratio of $H_2$:CO in the synthesis gas produced by steam reforming is typically relatively high, from 3:1 up to about 5:1. For most efficient use in the synthesis of methanol, the ratio of $H_2$:CO in synthesis gas should be adjusted to 2:1. Adjusting this ratio adds to the cost and complexity of the processing.

In contrast, the use of a catalytic reactor membrane for production of synthesis gas by partial oxidation of natural gas to CO and $H_2$ overcomes the disadvantages of steam reforming. First, the reaction to produce synthesis gas mediated by the catalytic membrane reactor ($CH_4 + \frac{1}{2}O_2 \rightarrow CO + 2H_2$) is exothermic, i.e., the reaction gives off heat. The heat produced can then be beneficially used in a cogeneration facility. Second, the synthesis gas produced using a catalytic membrane reactor should have an $H_2$:CO ratio of about 2:1. Additional processing steps are eliminated and all the natural gas consumed can be used to produce synthesis gas.

In a catalytic membrane reactor that facilitates oxidation/reduction reactions, a catalytic membrane separates an oxygen-containing gas from a reactant gas which is to be oxidized. Oxygen ($O_2$) or other oxygen-containing species (for example, $NO_x$ or $SO_x$) are reduced at one face of the membrane to oxygen anions that are then transported across the membrane to its other face in contact with the reactant gas. The reactant gas, for example methane, is oxidized, for example $CH_4$ to CO, by the oxygen anions with generation of electrons at the oxidation surface of the membrane.

Materials for membranes in catalytic membrane reactors must be conductors of oxygen anions, and the materials must be chemically and mechanically stable at the high operating temperatures and under the harsh conditions required for reactor operation. In addition, provision must be made in the reactor for electronic conduction to maintain membrane charge neutrality. Membrane materials of most interest are electron conductors, i.e., they conduct electrons.

Oxygen anion conductivity in a material can result from the presence of oxygen anion defects. Defects are deviations from the ideal composition of a specific compound or deviations of atoms from their ideal positions. Of interest for this invention are defects due to loss of oxygen from a compound leading to empty oxygen sites, i.e. oxygen vacancies, in the crystal lattice. A mechanism of oxygen anion conduction is "jumping" of the oxygen anions from site to site. Oxygen vacancies in a material facilitate this "jumping" and thus, facilitate oxygen anion conduction. Oxygen anion defects can be inherent in the structure of a given material of a given stoichiometry and crystal structure or created in a membrane material through reactions between the membrane material and the gas to which it is exposed under the conditions of operation of the catalytic membrane reactor. In a given system with a given membrane material, both inherent and induced defects can occur.

Materials with inherent oxygen anion vacancies are generally preferred. Loss of oxygen from a membrane material by reaction to create vacancies typically has a large effect on the structure of the material. As oxygen is lost, the size of the crystal lattice increases on a microscopic level. These microscopic changes can lead to macroscopic size changes. Because membrane materials are hard, size increases lead to cracking making the membrane mechanically unstable and unusable.

Electronic conductivity in a reactor is necessary to maintain charge neutrality permitting anion conduction through the membrane. It can be achieved by adding an external circuit to a reactor which allows for current flow. U.S. Pat. Nos. 4,793,904, 4,802,958 and 4,933,054 (all of Mazanec et al.) relate to membrane reactors where electronic conductivity is provided by an external circuit. In these patents, the membrane materials, which are compounds with general stoichiometry $AO_2$, with fluorite structures, such as yttria-stabilized zirconia, exhibit oxygen-anion conductivity.

Electronic conductivity can also be achieved by doping oxygen-anion conducting materials with a metal ion, as illustrated by U.S. Pat. Nos. 4,791,079 and 4,827,071 (both of Hasbun), to generate dual (electrons and oxygen anions) conducting materials. The Hasbun membranes are composed of fluorites doped with transition metals, including titania- and ceria-doped yttria-stabilized zirconia. The disadvantage of this approach is that the dopant metal ions can act as traps for migrating oxygen anions, inhibiting the ionic conductivity of the membrane.

The preferred method for obtaining electronic conductivity is to use membrane materials which inherently possess this property. Dual conducting mixtures can be prepared by mixing an oxygen-conducting material with an electronically-conducting material to form a composite, multi-component, non-single phase material. Problems associated with this method include possible deterioration of conductivity due to reactivity between the different components of the mixture and possible mechanical instability, if the components have different thermal expansion properties.

Cable et al., in European patent application No. 90305684.4 and the corresponding U.S. Pat. No. 5,306,411 of Mazanec at al. report multi-component solid membranes for oxidation/reduction reactions including the production of synthesis gas. The specific multi-phase components are mixtures of an oxygen-conducting material and an electronically conductive material. The oxygen-anion conducting material of the mixture is described as a perovskite $ABO_3$, including those materials where A and B represent a mixture of more than one metal ion, for example $La_aSr_bO_3$, $La_aSr_bFe_bO_3$, $La_aCa_bCoO_3$, $SrCo_aFe_bO_3$, and $Gd_aSr_bCoO_3$, where a and b are numbers and a +b=1. The electronically-conducting material of the mixture is one or more of a variety of metals, metal oxides, metal-doped metal oxides and including mixed metal oxides of a perovskite structure, for example, $YBa_2Cu_3O_x$ where x is a number from 6–7. Exemplified multi-component materials include palladium or platinum metal combined with yttria-stabilized zirconia; lanthanum, chromium and magnesium oxides combined with yttria-stabilized zirconia; $BMgLaCrO_x$ combined with yttria-stabilized zirconia and impregnated on its anode side with praseodymium, yttrium and zirconium; and praseodymium-doped indium oxide combined with yttria-stabilized zirconia.

In the same European patent application No. 90305684.4 and U.S. Pat. No. 5,306,411, single-phase, single-component membrane materials, described as exhibiting both oxygen-anion and electronic conductivity, are reported. The specific materials described are mixed metal oxides having a perovskite structure. The perovskite structure is based on that of the mineral perovskite, $CaTiO_3$. Perovskites have the general formula $ABO_3$, where A and B are metal ions. The ideal perovskite structure has a cubic lattice in which a unit cell contains metal ions at the corners of the cell, another metal ion in its center and oxygen ions at the midpoints of the cube edges. Examples of single-phase materials given are: $LaCoO_3$, $La_{0.6}Sr_{0.4}CoO_3$, $La_{0.2}Sr_{0.8}CoO_3$, $YCoO_3$, $YBa_2Cu_3O_x$, where x is a number from 6 to 7, $La_{0.2}Ca_{0.8}CoO_3$, $La_2Sr_{0.8}CoO_3$, $La_2Sr_{0.8}FeO_3$, $La_{0.2}Sr_{0.8}Fe_8Cr_2O_3$, $Gd_{0.2}Sr_{0.8}CoO_3$, and $La_{0.2}Sr_{0.8}Fe_{0.8}Cr_{0.1}Co_{0.1}O_{0.3}$.

U.S. Pat. No. 5,356,728 of Balachandran et al. also reports the use of mixed metal oxide materials having dual electron and oxygen anion conductivity as ceramic cores in cross-flow reactors. The mixed metal oxide is described as having a perovskite or perovskite-like structure with preferred perovskite structures comprising metals having atomic numbers 4 (Be), 12 (Mg), 20 to 31 (Ca, SC, Ti, V, Cr, Mn, Fe, Co, Ni, Cu, Zn, Ga), 38 to 41 (Sr, Y, Zr, Nb) and 56–71 (Ba, La, Ce, Pr, Nd, Pm, Sm, Eu, Gd, Tb, Dy, Ho, Er, Tm, Yb, Lu). Example formulas of oxygen-anion conductive ceramics listed are $La_aSr_bCoO_3$, $La_aCa_bCoO_3$, $La_aSr_bFeO_3$, $SrCo_aFe_bO_3$, and $Gd_aSr_bCoO_3$, where the sum of a +b is from about 1 to about 1.5. Materials said to be preferred are $SrCo_{0.5}FeO_x$, $SrCo_{0.8}Fe_{0.2}O_x$ and $La_{0.2}Sr_{0.8}Co_{0.4}Fe_{0.6}O_x$.

WO 94/24065 of Balachandran et al., which takes priority from U.S. Pat. No. 5,356,728, reports crystalline mixed metal oxide compositions of formula $Sr_\alpha(Fe_{1-x}Co_x)_{\alpha+\beta}O_\delta$, where x is a number from 0.1 up to 1, $\alpha$ is a number from 1 to about 4, $\beta$ is a number in a range upward from 0 to about 20 and $\delta$ is a number which renders the compound charge neutral, which are useful as membrane materials with oxygen anion conductivity. More specifically the formula for membrane materials is given as $Sr_4(Fe_{1-x}Co_x)_6O_\delta$ and the composition $SrCo_{0.5}FeO_\delta$ is specifically exemplified. The composition is also said to have a characteristic powder X-ray diffraction pattern comprised of principal lines given in Table 1 of the reference.

WO 94/24065 also reports the fabrication of ceramic cores for cross-flow reactors from $SrCo_{0.8}Fe_{0.2}O_x$ and $La_{0.2}Sr_{0.8}Co_{0.4}Fe_{0.6}O_x$ (materials described as preferred in U.S. Pat. No. 5,356,728) and the use of these cores in catalytic reactors for production of synthesis gas. The core made from $SrCo_{0.8}Fe_{0.2}O_x$ was reported to transport oxygen (0.5 to 3.5 $cm^3/min-cm^2$ oxygen permeation rate), but to have fractured after a relatively short time under test conditions. The core made from $La_{0.2}Sr_{0.8}Co_{0.4}Fe_{0.6}O_x$ was reported to have fractured in testing without exhibiting oxygen transport.

Teraoka Y., Zhang, H-M., Okamota, K., Yamazoe, N. (1988) *Mat. Res. Bull.* 23:51–58 and Teraoka, Y., Zhang, H-M., Furukawa, S., Yamazoe, N. (1985) *Chemistry Letts.* pp. 1743–1746 relate to oxygen permeation and mixed ionic and electronic properties of perovskite-type oxides $La_{1-x}Sr_xCo_{1-y}Fe_yO_{3-\delta}$. Teraoka, Y., Nobunaga, T., Yamazoe, N. (1988) *Chemistry Lett.* pp. 503–506 relates to the effect of cation substitution on the oxygen semipermeability of perovskite-type oxides. Matsumoto, Y., Yamada, S., Nishida, T., Sato E. (1980) *J. Electrochem. Soc.* 127(11):2360–2364 relates to use of $La_{1-x}Sr_xFe_{1-y}Co_yO_3$ as electrodes for oxygen evolution reactions in alkaline solution. Goodenough, J. B., Ruiz-Diaz, J. E., Zhen, Y. S. (1990) *Solid State Ionics* 44:21–31 and Zhen, Y. S., Goodenough J. B. (1990) *Mat. Res. Bull.* 25:785–790 relate to oxide-ion conduction in $Ba_2In_2O_5$ and $Ba_3In_2MO_8$. $Ba_2In_2O_5$ was shown to have a brownmillerite structure with ordered oxygen vacancies below a given transition temperature where ion conductivity was low. Ordered oxygen vacancies are said to inhibit oxide-ion conductivity.

U.S. Pat. No. 5,397,541 of Post et al. relates to an oxygen sensor which is "based on a thin film of a compound oxide supported on a substrate such as quartz." The oxide has a general formula $ABO_{2.5+x}$ where x is a variable changing from about 0 to about 0.5 between oxygen-depleted and oxygen-rich forms. A $SrFeO_{2.5+x}+O_2$ and a $Sr_{0.9}La_{0.1}FeO_{2.5+x}+O_2$ system are specifically disclosed. The thin film is formed by a laser ablation step from a sintered pellet target of oxygen-rich oxide or oxygen-depicted oxide.

SUMMARY OF THE INVENTION

This invention provides solid state gas-impermeable, ceramic membranes useful for promotion of oxidation-reduction reactions and for oxygen gas separation. These membranes behave as short circuited electrochemical cells with both ionic and electronic transport proceeding through the bulk membrane. Membranes of this invention are fabricated from a single-component material which exhibits both electron and oxygen-anion conductivity. The electron- and oxygen-anion-conducting materials of this invention are compounds having a brownmillerite structure which have the general formula $A_2B_2O_5$, where A and B most generally can be any metal.

Specifically, membrane materials of this invention are single-phase brownmillerite materials having the stoichiometric formula:

$$A_{2-x}A'_xB_{2-y}B'_yO_{5+z} \quad\quad\quad I$$

where A is an alkaline earth metal ion or mixture of alkaline earth metal ions; A' is a metal ion or mixture of metal ions where the metal is selected from the group consisting of metals of the lanthanide series and yttrium; B is a metal ion or mixture of metal ions wherein the metal is selected from the group consisting of 3d transition metals, and the group 13 metals; B' is a metal ion or mixture of metal ions where the metal is selected from the group consisting of the 3d transition metals, the group 13 metals, the lanthanides and yttrium; x and y are, independently of each other, numbers equal to, or greater than zero and less than 2; and z is a number that renders the compound charge neutral. The value of z generally is greater than zero and less than 1.0, more preferably z is greater than zero and less than or equal to about 0.5, and most preferably z is greater than zero and less than or equal to 0.3. The exact value of z depends upon the valencies and stoichiometries of A, A', B, and B'. Preferably x is greater than zero and less than 1, and y is greater than or equal to 1 but less than 2.

More specifically, the membrane materials of this invention are brownmillerite compounds of formula I where the B metal is selected from the group consisting of group 13 metals and mixtures thereof and the B' metal is selected from the group of 3d transition metals or mixtures thereof. Preferred group 13 metals are Al, Ga, and In, with Ga presently more preferred. Transition metal ions more useful for materials of this invention are Co, Ti, V, Cr, Mn, Ni and Fe. Preferred transition metal ions are Cr, Mn, Ni and Fe, with Cr, Mn, and Fe being more preferred and Fe being presently most preferred. Preferred A' metal ions are La and Y, with La being presently more preferred. Preferred A metal ions are Sr and Ba with Sr being presently more preferred.

Membrane materials of this invention include brownmillerite compounds of formula II:

$$A_{2-x}La_xB_{2-y}Fe_yO_{5+z} \quad\quad\quad II$$

where A is an alkaline earth metal ion or mixture of alkaline earth metal ions with A that is Sr and Ba being preferred, B is a metal ion or mixture of metal ions where the metal is selected from the group consisting of the 3d transition metals, or the group 13 metals, with B that is a group 13 metal being preferred and B that is 6a being more preferred; x and y, independently of one another, are numbers equal to or greater than zero and less than 2, with x greater than zero and less than or equal to about 1.0 more preferred and y greater than or equal to 1, but less than 2 more preferred; z is a number that renders the compound neutral, but is typically x/2.

In particular, membrane materials of this invention include brownmillerite materials of formula:

$$Sr_{2-x}La_xGa_{2-y}C_yO_{5+z} \quad\quad\quad III$$

where C is a 3d transition metal ion and preferably a 3d transition metal ion selected from the group consisting of Fe, Cr or Mu. Brownmillerites of formula IV being more preferred:

$$Sr_{2-x}La_xGa_{2-y}Fe_yO_{5+z} \quad\quad\quad IV$$

where x and y are numbers equal to or greater than zero but less than two. Preferably, x is greater than zero and less than about 1 and y is greater than or equal to 1, but less than 2.

Catalytic membranes of this invention promote the coupled reduction of an oxygen-containing gas and oxidation of a reactant gas. Catalytic membranes are shaped to have two surfaces: a reduction surface and an oxidation surface. The membrane is fabricated sufficiently thick to render it substantially gas-impermeable and mechanically stable to withstand the stresses associated with reactor operation, yet not so thick as to substantially limit the oxygen permeation rate through the membrane. Membranes can be fabricated in a variety of shapes appropriate for a particular reactor design, including disks, tubes, closed-end tubes or as reactor cores for cross-flow reactors.

In a catalytic reactor useful for oxidation/reduction reactions, the catalytic membrane forms a barrier between an oxygen-containing gas and a reactant gas, with the reduction surface of the membrane in contact with the oxygen-containing gas and the oxidizing surface of the membrane in contact with the reactant gas. The oxygen-containing gas is reduced at the reduction surface of the catalytic membrane generating oxygen anions at that surface which are conducted through the membrane to the oxidizing surface of the membrane. Oxygen anions at the oxidizing surface oxidize the reactant gas, generating electrons at that surface. Electrons are conducted back through the membrane to maintain electrical neutrality in the membrane and facilitate additional reduction and oxygen anion conduction.

In a catalytic reactor for oxygen separation, the catalytic membrane forms a barrier between an oxygen-containing gas, in contact with the reduction surface of the membrane, and an oxygen-depleted gas or partial vacuum in contact with the oxidation surface of the membrane. Oxygen is reduced at the reduction surface to form oxygen anions which are transported across the membrane, oxidized at the oxidizing surface of the membrane and released into the oxygen-depleted gas or partial vacuum. The oxygen-depleted gas does not substantially react with oxygen anions.

Examples of catalytic membrane reactions facilitated by use of the membrane and reactors of this invention include partial oxidation of methane, natural gas, light hydrocarbons other gaseous hydrocarbons and mixtures of methane or other hydrocarbons with or without $CO_2$ to synthesis gas, full or partial reductive decomposition of $NO_x$, $SO_x$, $CO_2$, and $H_2S$ and the separation of $O_2$ from mixtures of other gases, particularly its separation from air. Catalytic membranes of this invention can facilitate the reduction of $NO_x$ to $N_2$, $SO_x$ to S, $CO_2$ to CO, and $H_2S$ to S and $H_2O$.

The efficiency of the membrane for oxidation-reduction catalysis can be significantly increased by use of additional catalysts coated at one or both of the membrane surfaces. Ni is supported on metal oxides, as the partial oxidation catalyst, and is of particular interest for synthesis gas production.

This invention also provides a catalytic membrane reactor for reacting a reactant gas with an oxygen-containing gas or for separating oxygen from an oxygen-containing gas, including separating oxygen from a mixture with other gases. The product of oxygen separation can be substantially pure oxygen or a gas enriched in oxygen. The reactor comprises a membrane fabricated from brownmillerite mixed metal oxides of this invention and particularly mixed metal oxides of Formulas I–IV. The reactor has at least one reactor cell having a reduction zone and an oxidation zone physically separated from each other by the catalytic membrane. The reduction and oxidation surfaces of the membrane are in contact with the reduction and oxidation zones, respectively, of the reactor. The reactor for oxidation reduction has an entrance port for each of the reacting gases (oxygen-containing gas and reactant gas) and an exit port for reacted gases. The reactor for oxygen separation has an entrance port for the oxygen-containing gas and an exit port for the residual gas from which the oxygen is separated. The reactor for oxygen separation has a means for collecting the separated oxygen from the reactor oxidation zone.

The invention further provides a method for oxidizing a gas, e.g., a reactant gas, capable of reacting with oxygen, employing the catalytic membranes of this invention and a method of separating oxygen from an oxygen-containing gas, including a mixture of gases containing oxygen employing the catalytic membranes of this invention and particularly membranes fabricated from compounds of formulas I–IV.

The method for oxidizing a gas comprises the steps of:

(A) providing a catalytic membrane reactor cell with an oxidation zone and a reduction zone separated by a brownmillerite membrane of this invention;

(B) heating the reactor cell to a temperature of from about 300° C. to about 1200° C.;

(C) passing an oxygen-containing gas in contact with the reduction surface of the membrane; and (D) providing the reactant gas in contact with the oxidation surface of said membrane, thereby reducing the oxygen-containing gas and oxidizing the reactant gas. More preferably the reactor and membrane are heated to a temperature from about 600° C. to 1100° C.

The invention also provides a method for oxygen separation from an oxygen-containing gas which employs a membrane reactor comprising a brownmillerite membrane of this invention. Oxygen separation comprises the steps of:

(A) providing a catalytic membrane reactor cell comprising an oxidation zone and a reduction zone separated by a membrane of this invention;

(B) heating the reactor cell to a temperature of from about 300° C. to about 1200° C., more preferably to a temperature of 600° C. to 1100° C.; and (C) passing an oxygen-containing gas, such as air, in contact with the reduction surface of the membrane, thereby generating separated oxygen in said oxidation zone. The reactor will have some means for collecting the separated oxygen from the oxidation zone, such as passing an inert gas or ion reactive, oxygen-depleted gas through the oxidation zone or applying a partial vacuum to the oxidation zone.

BRIEF DESCRIPTION OF THE DRAWINGS

FIGS. 10A and 10B depict a membrane disk reactor employed in assessing membrane materials of this invention. The reactor is illustrated for introduction of $CH_4$ (or $CH_4$ mixtures with $CO_2$) and $O_2$ (or oxygen mixtures, such as air) and generation of synthesis gas.

DETAILED DESCRIPTION OF THE INVENTION

Figure 1:
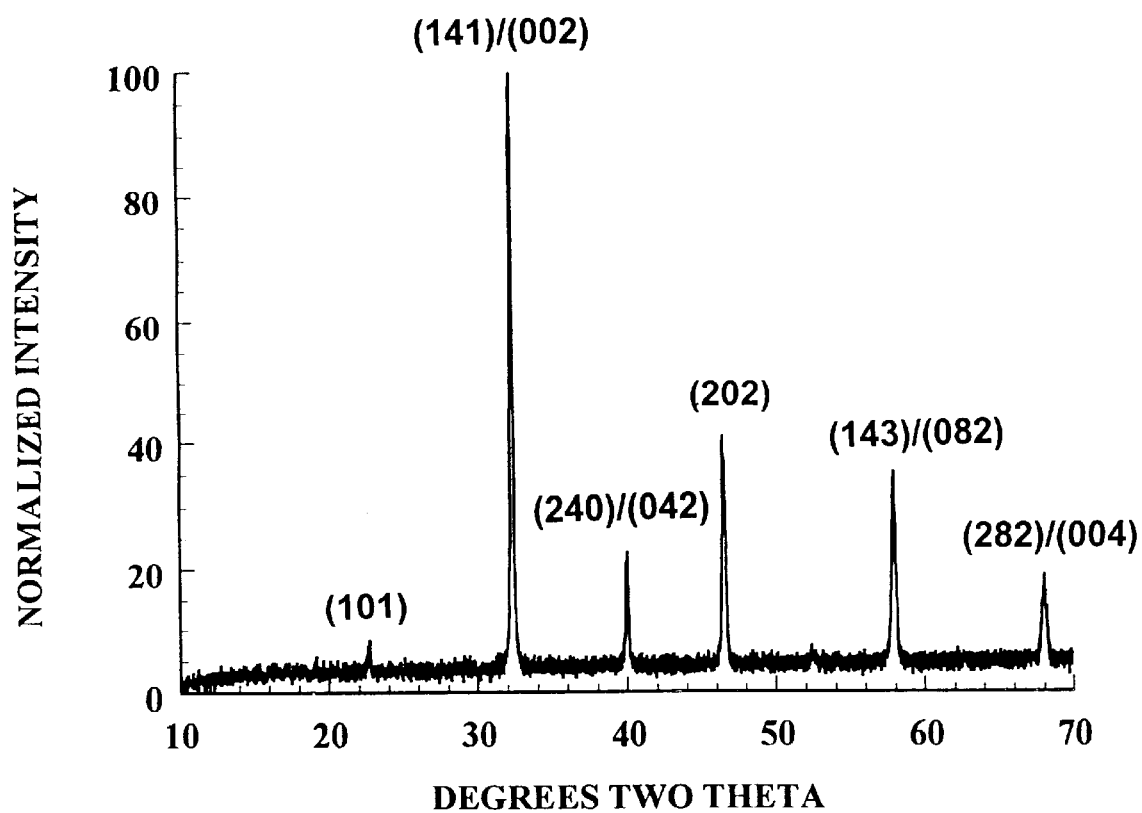
FIG. 1 is the X-ray diffraction (XRD) pattern for $Sr_{1.6}La_{0.4}Ga_{0.4}Fe_{1.6}O_{5.2}$

The term "oxygen-containing gas" is used broadly herein to include gases and mixtures of gases in which at least one of the component gases is oxygen or an oxide. The oxygen or oxide component of the gas is capable of being reduced at the reduction surface of the membrane of this invention. The term includes carbon, nitrogen, and sulfur oxides ($CO_x$, $NO_x$ and $SO_x$) among others, and gas mixtures in which an oxide is a component, e.g. $NO_x$ in an inert gas or in another gas not reactive with the membrane. The term also includes mixtures of oxygen in other gases, e.g. $O_2$ in air. In the reactors of this invention, the oxygen-containing gas is passed in contact with the reduction surface of the membrane and the oxygen-containing component of the gas is at least partially reduced at the reduction surface, e.g., $NO_x$ to $N_2$. The gas passing out of the reduction zone of the reactor may contain residual oxygen or oxygen-containing component.

The term "reactant gas" is used broadly herein to refer to gases or mixtures of gases containing at least one component that is capable of being oxidized at the oxidation surface of a reactor of this invention. Reactant gas components include, but are not limited to methane, natural gas (whose major component is methane), and gaseous hydrocarbons including light hydrocarbons (as this term is defined in the chemical arts). Reactant gases include mixtures of reactant gas components, mixtures of such components with inert gases, or mixtures of such components with oxygen-containing species, such as CO, $CO_2$ or $H_2O$. The term "oxygen-consuming gas" may also be used herein to describe a reactant gas that reacts with oxygen anions generated at the oxidizing surface of the membrane.

The term "oxygen-depleted gas," dependent upon the context in the specification, may refer (1) to a gas or gas mixture from which oxygen has been separated by passage through a reactor of this invention (i.e., the residual of the oxygen-containing gas) or (2) to a gas or gas mixture that is introduced into the oxidation zone of a reactor used for oxygen separation to carry the separated oxygen. In the second context, the oxygen-depleted gas may be an inert gas, air or other non-reactive gas that substantially does not contain components that will be oxidized in the oxidation zone of the reactor. When used in the second context the term can be applied to mixtures containing some oxygen, such as air, the oxygen content of which will be increased by passage through the oxidation zone of the reactor.

The term "partial vacuum" applies to the application of a partial vacuum, i.e., less than ambient pressure, to the oxidation zone of a reactor and may refer to high or low vacuum depending upon the construction of the reactor. Application of a partial vacuum to the oxidation zone of a reactor used for oxygen separation can be employed to collect and ultimately concentrate the separated oxygen.

The terms "reactant gas," "oxygen-depleted gas," "oxygen-consuming gas," and "oxygen-containing gas" and any other gas mixture discussed herein includes materials which are not gases at temperatures below the temperature ranges of the pertinent process of the present invention, and may include materials which are liquid or solid at room temperature. An example of an oxygen-containing gas which is liquid at room temperature is steam.

The term "gas-impermeable" as applied to membrane materials of this invention means that the membrane is substantially impervious to the passage of oxygen-containing or reactant gases in the reactor. Minor amounts of transport of gases across the membrane may occur without detriment to the efficiency of the reactor. It may be that membranes of this invention will allow passage of low molecular weight gases such as $H_2$. The membranes of this invention conduct oxygen anions and in this sense are permeable to oxygen.

The membrane materials of this invention are mixed metal oxides having a brownmillerite structure with the formula:

$$A_{2-x}A'_xB_{2-y}B'_yO_{5+z} \qquad I$$

where A, A', B, B', x, y and z are as defined above.

A brownmillerite is one of a class of minerals, including mixed metal oxides, having as structure like that of the mineral brownmillerite, $Ca_2AlFeO_5$. The general formula of a brownmillerite is $A_2B_2O_5$, where the sum of the valences of the A and B atoms is 5. The brownmillerite structure is characterized in having sheets of perovskite-like corner sharing octahedra perpendicular to the crystallographic b axis, separated by layers of single chains of tetrahedra containing ordered vacancies that are parallel to the c axis. Brownmillerite is, thus, a defect perovskite with the oxygen defects in a particular order. Further, in a substituted brownmillerite $AA'BB'O_{5+z}$, where the ratio of B:B' is 1, and where B is a group 13 metal and B' is a 3d transition metal, all the B ions will substantially occupy octahedra positions and all the B' ions will occupy tetrahedral positions in the lattice.

A compound of brownmillerite structure is distinct from a perovskite. The two structures can be distinguished by X-ray diffraction (XRD). See: Y. Teraoka, H.-M. Zhang, S. Furukawa and N. Yamazoe (1985) Chemistry Lett. supra. XRD patterns of membrane materials of this invention can be fit to a Pcmn cell as expected for the brownmillerite structure. See, P. K. Gallagher, J. B. MacChesney and D. N. E. Buchanan (1964) *J. Chem. Phys.*, 41:2429; C. Greaves, A. J. Jacobson, B. C. Tofield and B. E. F. Fender (1975) *Acta Cryst.*, B31:641. Table 1 provides lattice parameters for a number of brownmillerite membrane materials of this invention.

A perovskite is one of a class of materials having a structure based on that of the mineral perovskite, $CaTiO_3$. An ideal perovskite structure has a cubic lattice in which a unit cell contains metal ions at each of the corners and in the middle of the cell and oxygen ions at the midpoints of the edges of the cell. The general formula of a perovskite is $ABO_3$ where A and B are metal ions, the sum of the valences of which are 6. Cable et al. EP 90305684.4 and U.S. Pat. No. 5,306,411 further describe that the radii of the A and B metal ions of a perovskite must conform to the relationship:

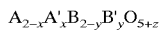

where $r_A$, $r_B$ and $r_O$ are the radii of the A, B and O ions, respectively, and t is a tolerance factor which lies within the approximate range 0.7–1.0.

In a single-phase material, the atoms of the various components of the material are intermingled in the same solid phase. The presence of a single-phase can be assessed by XRD or similar known techniques of structural determination. For example, a single-phase brownmillerite compound is distinguished in that all of the peaks in the XRD can be accounted for by the brownmillerite structure.

FIG. 1 presents an XRD pattern of $Sr_{1.6}La_{0.4}Ga_{0.4}Fe_{1.6}O_{5.2}$ powder at a scan rate of $\frac{1}{20}(2\theta)$ min. This is a typical pattern for the family of compounds $A_{2-x}La_xB_{2-y}Fe_yO_{5+x/2}$. The pattern was fit to an orthorhombic unit cell, Pcmn, with a=5.534 Å, b=15.68 Å and c=5.513 Å. Sintered densities for disks were determined based on disk weight and dimensions.

Decreasing the amount of Sr relative to La decreases cell volume, consistent with the smaller ionic radius of $Sr^{2+}$ compared to $La^{3+}$. In contrast, cell volumes generally decrease as a function of increasing Fe content. This is the opposite of what would be expected since $Ga^{3+}$ has a smaller cover radius compared to $Fe^{3+}$. This indicates that factors other than simple ionic radii, such as electronic effects or structural distortions, are affecting cell volumes.

The brownmillerites of this invention exhibit both oxygen anion conductivity and electronic conductivity. Certain of the brownmillerites of this invention exhibit particular stability for use as membranes in catalytic membrane reactors. These materials exhibit mechanical stability and thermal stability under reaction conditions. Materials such as $LaFeO_3$ and $Sr_2Fe_2O_5$, for example, are not thermally stable at oxygen partial pressures less than about $10^{-16}$ atm and are not expected to be stable under the highly reducing conditions of a catalytic membrane reactor. Substitution of less reducible metal ions, including Al, Ga, or In, into the brownmillerites of this invention leads to increased thermal stability under reducing conditions.

Exposure of a material like $La_{0.9}Sr_{0.1}FeO_{3-x}$, which contains Fe, to reducing atmospheres, as in a catalytic reactor, results in loss of oxygen and an increase in lattice parameter. Fe can take the forms $Fe_2O_3 \rightarrow Fe_3O_4 \rightarrow FeO \rightarrow Fe$ as oxygen content changes. This, in turn, leads to expansion of the bulk material which can cause cracking, particularly if the material is constrained as is a reactor membrane. Metal ions, such as Al, Ga or In, in comparison to Fe, do not exist in these various oxide forms as oxygen decreases. Substitution of such metal ions for Fe in the brownmillerites of this invention, reducing overall Fe content, reduces expansion of the bulk material on exposure to reducing atmospheres and generally improves the mechanical stability of membranes.

Table 2 presents the results of conductivity (anion and total (anion +electron)) measurements of representative mixed oxide membrane materials. For compounds of formula $A_{2-x}La_xB_{2-y}Fe_yO_{5+x/2}$, in general, and more particularly for compounds of formula $Sr_{2-x}La_xGa_{2-y}Fe_yO_{5+x/2}$, total conductivity for a given reactor temperature increases with Fe content in the material. This trend reflects the trend in electronic conductivity which dominates the total conductivity. The trend observed can be rationalized as the result of enhanced electron exchange and electronic conductivity between Fe atoms within the lattice as Fe content increases. In contrast, there is no clearly discernible similar trend with ionic conductivity. However, ionic conductivity does tend to increase with Fe content in the series where x is held constant, i.e., for the series $Sr_{1.6}La_{0.4}Ga_{2-y}Fe_y$. As noted above, increases in Fe content cause a decrease in cell volume for exemplified membrane materials (Table 1). Thus, in exemplified materials, ionic conductivities generally increase with decreasing cell volumes. This trend is in contrast to earlier work indicating that ionic conductivities are expected to increase with increasing cell volume (A. F. Sammells, R. L. Cook, J. H. White, J. J. Osborne and R. C. MacDuff (1992) *Solid State Ionics* 52:111; R. L. Cook and A. F. Sammells (1991) *Solid State Ionics* 45:311; R. L. Cook, R. C. MacDuff and A. F. Sammells (1990) *J. Electrochem. Soc.* 137:3309.) The result also indicates that electronic effects may play a role in the ionic conductivities of these materials.

Table 3 presents a summary of the results of catalytic performance experiments using exemplary membrane materials tested with Ni as the oxidation catalyst and $La_{0.8}Sr_{0.2}CoO_{3-x}$ (where x is a number such that the compound is neutral) as the reduction catalyst. The reaction examined was synthesis gas production from methane and methane/$CO_2$ mixtures. Of the materials listed in Table 3, more preferred catalytic reactor membrane materials are those of composition $Sr_{2-x}La_xGa_{2-y}Fe_yO_{5+z}$ (where z=x/2, x is 0.4 to 0.3 and y is $1 \leq y \leq 1.6$. The most active materials listed in Table 3 are $Sr_6La_{0.4}Ga_{0.6}Fe_{1.4}O_{5.2}$, $Sr_{1.6}La_{0.4}Ga_{0.8}Fe_{1.2}O_{5.2}$, $Sr_{1.7}La_{0.3}Ga_{0.6}Fe_{1.4}O_{5.15}$, $Sr_{1.7}La_{0.3}GaFeO_{5.15}$, and $Sr_{1.6}La_{0.4}Ga_{0.4}Fe_{1.2}O_{5.2}$, having total synthesis gas production rates of between 4.8 to 8.3 ml/min-$cm^2$ with $H_2$:CO ratios of ~2. $Sr_{1.8}La_{0.2}GaFeO_{5.1}$ exhibited a higher total synthesis gas production rate (9.8 ml/min-$cm^2$, at 900° C.), but exhibited much higher $H_2$:CO ratios. The significantly higher $H_2$:CO ratios obtained with this membrane material indicate that there was significant $H_2$ formation due to coking. Higher coking rates may be a sign of poor oxygen flux through a membrane. However, $Sr_{1.8}La_{0.2}GaFeO_{5.1}$ exhibited one of the highest ionic conductivities (at 900° C.) of the materials listed in Table 2. It might be expected that since ionic conductivity of the material should correlate directly with oxygen flux through the membrane, that a membrane's activity for partial oxidation of methane would also correlate directly with ionic conductivity. The results summarized in Tables 2 and 3 indicate that, in general, those materials exhibiting higher ionic conductivities also exhibit higher activity towards synthesis gas production. But there are notable exceptions, such as $Sr_{1.8}La_{0.2}GaFeO_{5.1}$. These apparent exceptions may simply be an artifact of measurement of ionic conductivities in membranes in an air/He environment, rather than in the air/methane environment of the catalytic reaction. Exposure of the membrane material to methane may change the defect chemistry relative to exposure to helium. If this is the case, then ionic conductivity would be differentially affected by methane and helium.

Electronic conductivities of the materials examined are larger than their ionic conductivities. Reactor performance with these materials is more likely limited by ion flux rather than electron flux. It is not surprising that among the materials examined there is no clear dependence of catalytic performance on total conductivity.

Figure 2:
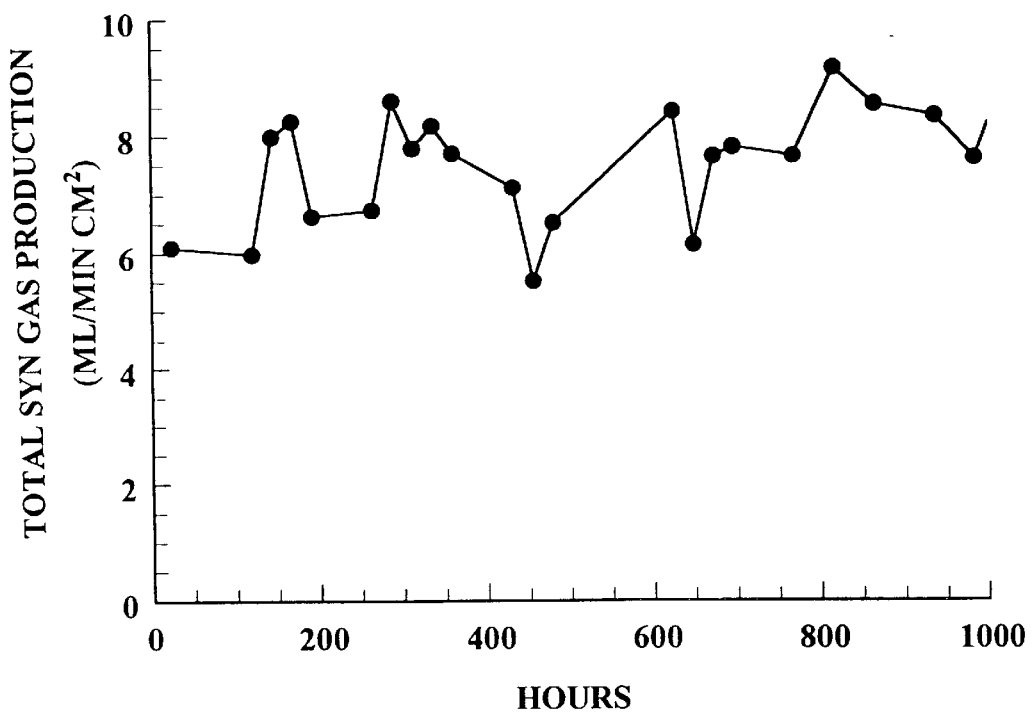
FIG. 2 is a graph of total synthesis gas production as a function of time (h) with a sintered disk membrane of $Sr_{1.7}La_{0.3}GaFeO_{5.15}$ having Ni epoxy as the partial oxidation catalyst and LSC as the reduction catalyst.

A long-term stability test was performed at 900° C. in a reactor having a disk membrane (0.17 cm thick) fabricated from $Sr_{1.7}La_{0.3}GaFeO_{5.15}$ with Ni as the partial oxidation catalyst and LSC as the reduction catalyst. The cell proved to be stable for more than 1000 h. FIG. 2 is a graph illustrating synthesis gas production at a rate of 6–8 ml/min $cm^2$ as a function of time in this reactor. The ratio of $H_2$:CO in the synthesis gas produced was 1.6–1.8 with a small amount of $CO_2$. Synthesis gas production for this reactor cell was relatively constant over this time with no loss of productivity. The membrane was found to be mechanically stable after the experiment was terminated. The XRD pattern of the membrane after over 1000 h of operation did not show any substantial signs of decomposition.

Figure 3:
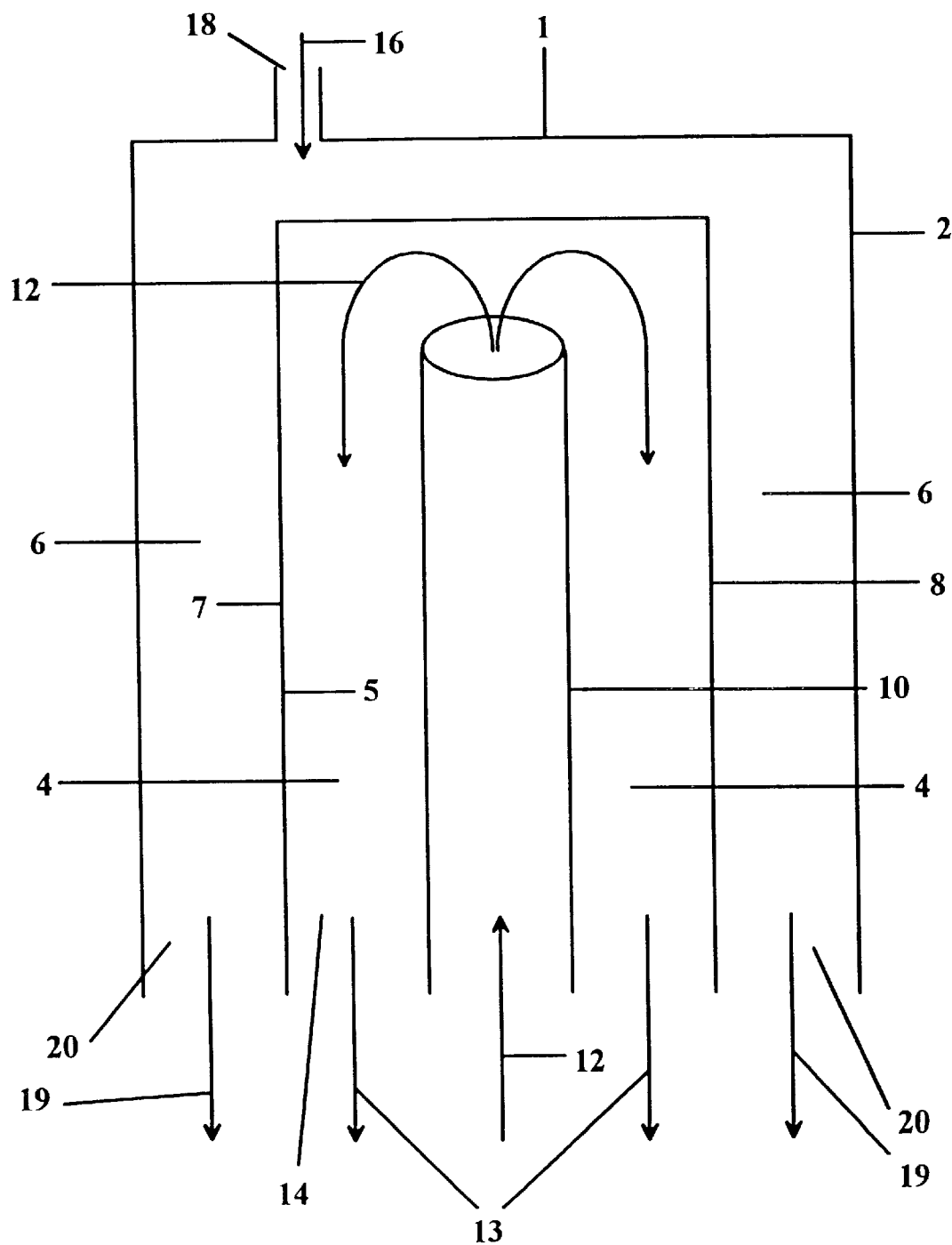
FIG. 3 is a schematic view of a single-cell catalytic reactor embodying the present invention.

Referring now to the drawings, where like numbers represent like features, a single-cell catalytic membrane reactor of the present invention may be schematically represented, in cross-sectional view, as shown in FIG. 3. The reactor 1 includes a cell 2 having an oxidation zone 4 separated from a reduction zone 6 by a solid state membrane 8. The membrane 8 illustrated is cylindrical shape, more specifically a closed-end tube, but any shape capable of creating two separate zones would be sufficient. The outer perimeter of the oxidation zone 4 is defined by the membrane 8 and the outer perimeter of the reduction zone 6 is defined by the reactor shell. The membrane has a reduction surface 7 facing the reduction zone 6, i.e., the outer surface of the tube, and an oxidation surface 5, i.e., the inner surface of the tube facing the oxidation zone 4. Feed tube 10 delivers a reactant gas 12, such as methane, into the oxidation zone 4. Reacted gases, including products of oxidation, 13 exit the oxidation zone 4 via at least one exit port 14. An oxygen-containing gas 16, such as air, is delivered into the reduction zone 6 via entrance port 18. Reacted gases 19, such as oxygen-depleted air, exit the reduction zone 6 via exit port 20.

Figure 4:
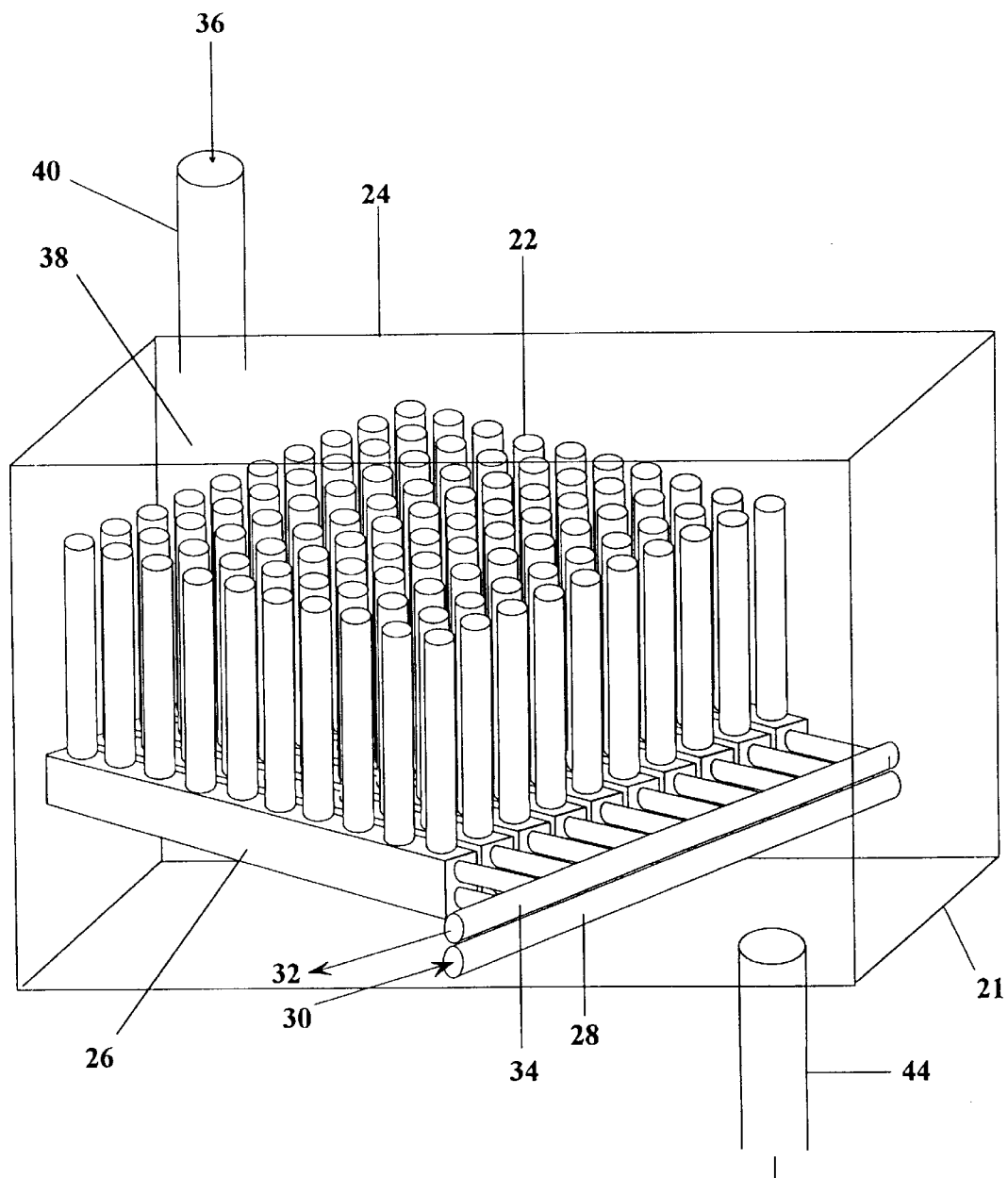
FIG. 4 is a perspective view of a multiple-membrane catalytic reactor.

Referring now to FIG. 4, there is depicted a multiple-cell reactor 21 utilizing cells of the type described above and depicted in FIG. 3. The cells which comprise closed-end membrane tubes, like those of FIG. 3, are enclosed in a reactor module 24, and are linked together by manifold 26. An inlet feed tube 28 delivers reactant gas 30 to reactor cells 22, and reacted gas 32 exits the cells via the manifold 26 through exit tube 34. An oxygen-containing gas 36 is delivered to the reduction zone 38 via reactor shell inlet port 40. Reacted gas 42 exits the reduction zone 38 via outlet port 44.

U.S. Pat. No. 5,306,411, which is incorporated by reference in its entirety herein, provides a description of an electrochemical reactor design for production of synthesis gas, among other products. U.S. Pat. No. 5,356,728, which is also incorporated by reference in its entirety herein, provides a description of a cross-flow reactor cell for production of synthesis gas among other products. The membrane materials of this invention can be readily adapted for use in reactors described in these patents.

FIGS. 5–9 depict several processes utilizing a membrane of this invention. Optional catalysts 51, 52 may be provided on the oxidation surface 54 and/or the reduction surface 56 for each process, as discussed below. Examples of processes which may be conducted are the combustion of hydrogen to produce water, the partial oxidation of methane, natural gas or other light hydrocarbons, to produce unsaturated compounds or synthesis gas, the partial oxidation of methane or natural gas to produce unsaturated compounds or synthesis gas, the partial oxidation of ethane, extraction of oxygen from oxygen-containing gases, e.g., extraction of oxygen from $NO_x$, wherein x has a value from 0.5 to 2; $SO_y$, wherein y has a value from 2 to 3; steam; $CO_2$; ammoxidation of methane to hydrogen cyanide, and oxidation of $H_2S$ to produce $H_2O$ and S.

In practice, an oxygen-containing gas or gas mixture, such as air, is passed in contact with the membrane in the reduction zone 6, and the reactant gas or gas mixture, i.e., the oxygen-consuming gas, such as a reactant gas containing methane is passed in contact with the membrane 8 in the oxidation zone 4. As the oxygen-containing gas or gas mixture contacts the membrane 8, oxygen is reduced to oxygen anions which are transported through the membrane to the membrane oxidation surface, facing the oxidation zone. In the oxidation zone the oxygen anions react with the oxygen-consuming gas or gas mixture, oxidizing the oxygen-consuming gas and releasing electrons. The electrons return to the membrane reduction surface 7 facing the reduction zone 6 via the membrane 8.

Figure 5:
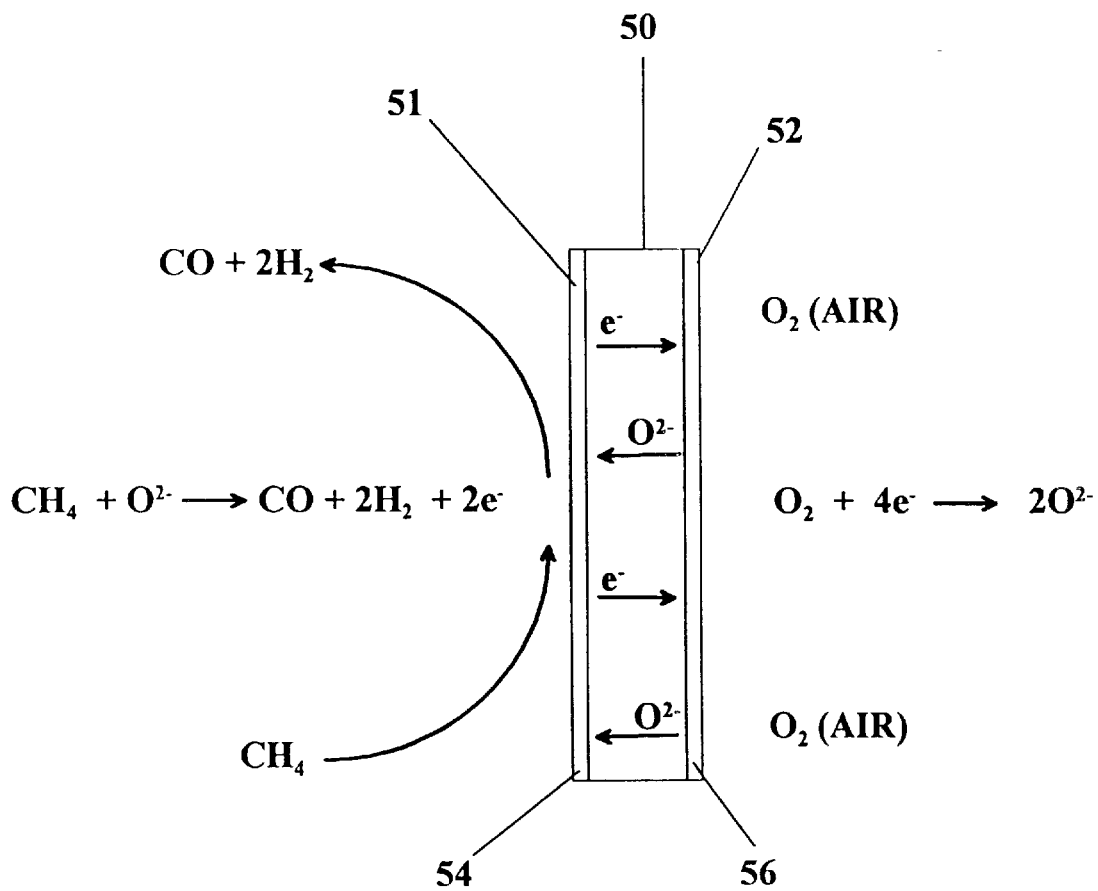
FIG. 5 is a schematic diagram of a membrane and catalysts for a process of natural gas conversion to synthesis gas.

In one process embodied by the invention, the oxidation zone 4 of the catalytic membrane reactor 1 is exposed to a reactant gas which contains components capable of reacting with oxygen or oxygen anions. The reactive components can include, among others, both unsaturated and saturated linear, branched, and cyclic hydrocarbons, as well as aromatic hydrocarbons. Specific examples include methane, ethane, ethylene, propane, etc., cyclopropane, cyclobutane, cyclopentane, cyclopentene, etc., isobutane, isobutene, methylpentane, etc., and benzene, ethylbenzene, napthalene, etc. The reduction zone is exposed to oxygen or air. For example, in one process for which the reactor is suitable, as shown in FIG. 5, the reactant gas is methane ($CH_4$) or natural gas, and the oxygen-containing gas or gas mixture is air. As air contacts the membrane, the oxygen component of air is reduced to oxygen anions which are transported through the membrane to the oxidation zone where the oxygen anions react with the methane to produce synthesis gas or olefins, depending on the reaction conditions and catalyst materials employed. It may also be useful to add steam or $CO_2$ to the $CH_4$ feed stream. The addition of steam or $CO_2$ will serve to keep the methane partial oxidation reaction at the thermoneutral point so as to prevent unwanted buildup of heat.

Figure 6:
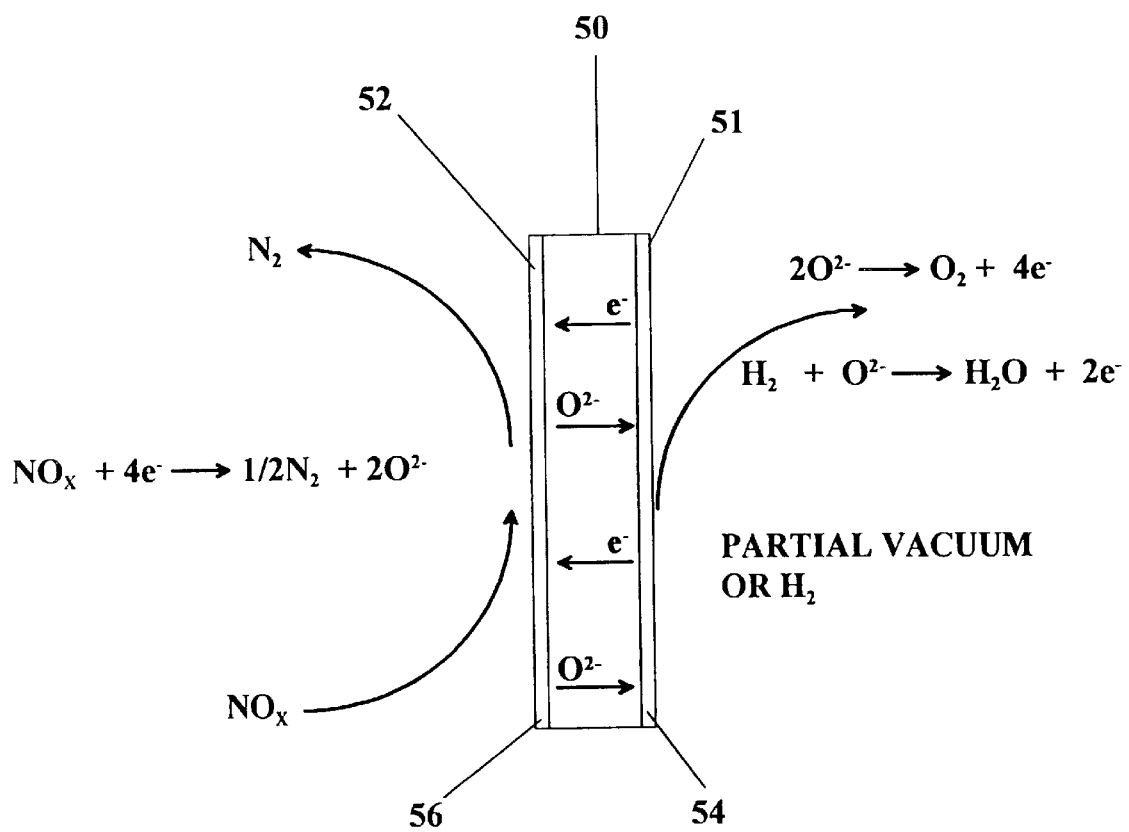
FIG. 6 is a schematic diagram of a membrane and catalysts for a process of decomposition of $NO_x$.
Figure 7:
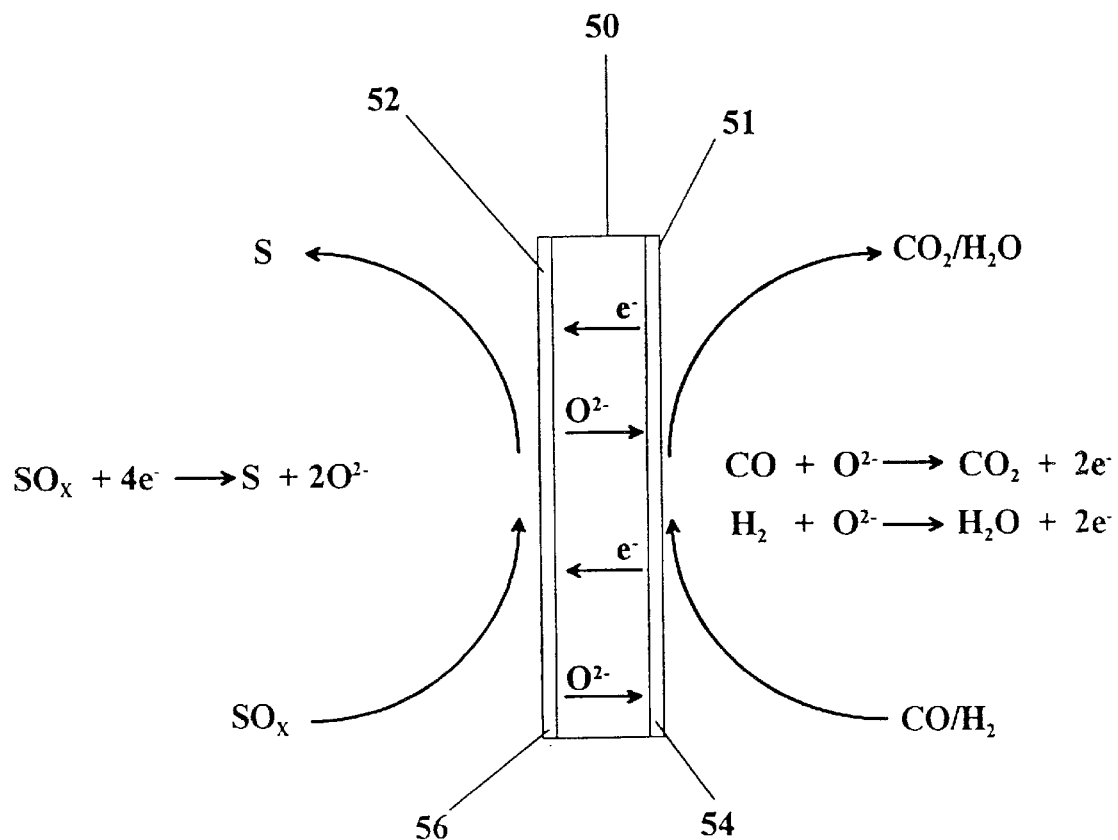
FIG. 7 is a schematic diagram of a membrane and catalysts for a process of sulfur dioxide decomposition.

In another type of process suitable for the catalytic membrane reactor of this invention, as depicted in FIGS. 6 and 7, the reduction zone of the reactor will be exposed to an oxygen-containing gas which is capable of losing oxygen, for example, NO, $NO_2$, $SO_2$, $SO_3$, CO, $CO_2$, etc. The oxidation zone is exposed to a partial vacuum, an inert gas, or a gas that will react with oxygen. Effective ranges of partial vacuum range from approximately 100 Torr to $10^{-6}$ Torr. An example is where the reactant gas is methane, natural gas, or hydrogen and the oxygen-containing gas is a flue or exhaust gas containing $NO_x$, and or $SO_y$, wherein x is 0.5 to 2 and y is 2 to 3. As the flue gas contacts the membrane, any oxygen present or the oxygen in $NO_x$ and/or $SO_y$ is reduced to oxygen anions which are transported through the membrane to the oxidation zone where the oxygen anions react with the oxygen-consuming gas to produce carbon dioxide and water, synthesis gas or olefins, depending on the reaction conditions. Nitrogen gas and elemental sulfur are produced from $NO_x$ and $SO_y$ respectively, in the reduction zone.

Figure 8:
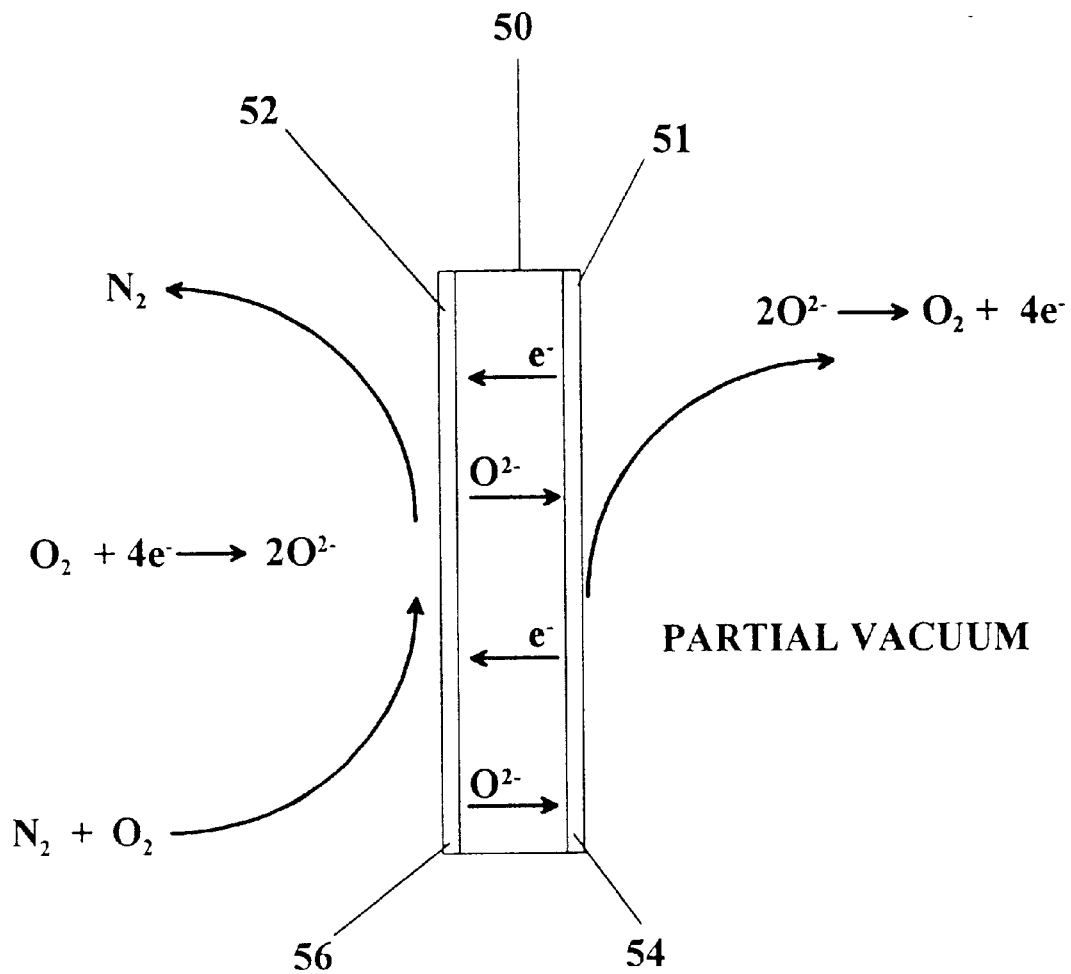
FIG. 8 is a schematic diagram of a membrane and catalysts for a process of oxygen separation from air.

In another process performed by this reactor, the reactor serves to separate oxygen from air or other gas mixtures in which $O_2$ is a component, as shown in FIG. 8. For example, the reduction zone of the catalytic membrane reactor is exposed to air, while the oxidation zone is exposed to a partial vacuum. Oxygen gas is reduced to oxygen anions at the membrane surface, and the oxygen anions are subsequently transported through the membrane from the air side to the vacuum side. At the vacuum side, the oxygen anions recombine to form oxygen gas releasing electrons. Gas exiting from the oxidation zone is enriched in oxygen.

In yet another embodiment of the present invention, the oxygen-containing gas is a gas-containing steam (i.e., $H_2O$ gas). As $H_2O$ contacts the membrane, the oxygen of $H_2O$ is reduced to oxygen anions which are transported through the membrane to the oxidation zone where the oxygen anions react with methane or natural gas, for example. The $H_2O$ is reduced to hydrogen gas ($H_2$) in the reduction zone. The hydrogen gas may be recovered and used, for example, to hydrogenate unsaturated hydrocarbons, provide fuel for an electrical current generating fuel cell, to provide fuel for heating the catalytic membrane reactor of this invention or to provide reactant gas for the process for extracting oxygen from an oxygen-containing gas in accordance with the present invention.

Materials which are co-present in reactor feed gases may participate in catalytic membrane reduction or oxidation taking place at the membrane of the present invention. When, for example, methane is present with ammonia in the oxidation zone and an oxygen-containing gas is present in the reduction zone, hydrogen cyanide and water can be produced in the oxidation zone. Reactors of the present invention can also be applied to the oxidative reforming of $CO_2/CH_4$ mixtures to synthesis gas.

Figure 9:
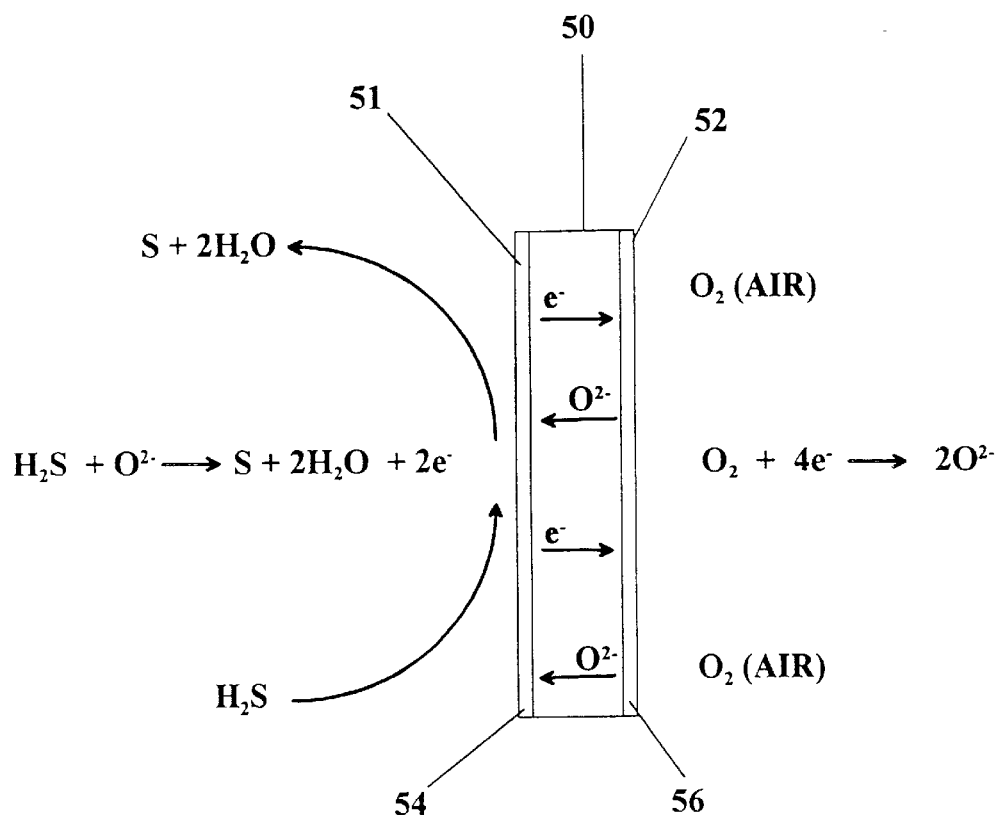
FIG. 9 is a schematic diagram of a membrane and catalysts for a process of decomposition of $H_2S$.

In another embodiment of the present invention, as shown in FIG. 9. the oxidation zone of the reactor is exposed to $H_2S$ and the reduction zone is exposed to oxygen or an oxygen-containing gas. The oxygen is reduced to oxygen anions which are transported through the membrane and react with $H_2S$ to give $H_2O$ and S.

Other combinations of materials reactive with each other to produce a wide range of products are possible and are contemplated as being within the scope of the invention.

The membrane materials of the present invention have the advantage that the oxygen defects are formed directly in the structure through variations in the composition of the materials. The existence of inherent vacancies does not, however, preclude the formation of more oxygen vacancies through reaction.

The specific reaction for the production of synthesis gas from methane is:

$$CH_4 + \tfrac{1}{2}O_2 \rightarrow CO + 2H_2$$

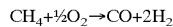

For the decomposition of $NO_x$ by the catalytic membrane reactor, the reaction is as follows:

$$2NO + 4e^- \rightarrow N_2 + 2O^{2-}$$

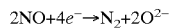

where the electrons are supplied by the membrane and the oxygen ions are transported away from the membrane surface through the membrane. Examples of empirical catalytic membrane processes occurring at the interfaces of the membrane in the reactor are represented in FIGS. 3–7. The decomposition of SO, may be accomplished in analogous fashion to that of $NO_x$. Optional Catalysts It has been found that certain catalysts may be used to significantly enhance the efficiency of the reaction being mediated by the membrane. Catalysts to be used are specific to each reaction. For example, in the partial oxidation of methane, natural gas, or light hydrocarbons to synthesis gas, the catalyst must be able to dissociatively adsorb the hydrocarbon species, followed by oxygen atom transfer to the dissociatively adsorbed residue. The first requirement is met with catalysts possessing considerable hydrogen affinity (e.g. surface hydride forming ability or surface basicity). Oxygen atom transfer to the residue implies that the catalyst possesses only modest metal-oxygen binding energy and has reversible reducibility. Catalysts possessing these features include the platinum group metals Ni, Pd, Pt, Rh, Ru, Ir, and Os, as well as the first row transition metals Fe, Mn, and Co. Incorporation of these metals or their combinations onto the oxidation surface of oxygen anion conducting membranes provides a strategy for direct partial oxidation of hydrocarbons. Moderation of catalyst activity to avoid coke formation is achieved by the incorporation of metal clusters into ceramics such as $CeO_2$, $Bi_2O_3$, $ZrO_2$, $CaB_{1-x}B'_xO_3$, $SrB_{1-x}B'_xO_3$ or $BaB_{1-x}B'_xO_3$ (where B=4+-lanthanide ion such as Ce, Tb, or Pr);B'=3+-lanthanide ion such as Gd or Nd; and 0<x<0.2). Additionally, incorporation of transition metal ions into the B-site of a perovskite, with a basic A-site, will give an active catalyst since the bonding of the metal ion to oxygen will be correspondingly weakened and the oxygen atom transfer activity of the metal ion enhanced. Perovskites possessing the general formula $A_{1-x}A'_xB_{1-y}B'_yO_3$ (where A=lanthanide metal ion or Y; A'=alkali or alkaline earth cation and 0<x<0.8; B=transition metal ion such as Fe, Ni, or Co; B'=Ce or Cu, Ag, Au or Pt, Pd, or Ni and 0<y<0.3) may be used.

In order to identify interfacial requirements for promoting initial oxygen dissociative adsorption and subsequent electron transfer, the overall oxygen reduction reaction of interest for which optimum electrocatalysis is sought was considered. This reaction may be represented by:

$$O_{2(g)} + 4e^- + 2V_o^{..} \rightarrow 2O_o$$

where $V_o^{..}$ represents an oxide ion vacancy in a normal lattice position where such vacancy sites would be expected to be compatible towards stabilization of $O^{2-}$ species. Requirements for oxygen reduction may be appreciated by breaking the overall reduction reaction into the following distinct steps:

1. $O_{2(g)} \rightarrow O_{2ads}$  Initial oxygen adsorption on the electrocatalysts
2. $O_{2ads} \rightarrow 2O_{ads}$  Oxygen dissociation
3. $O_{ads} + 2e + vo \rightarrow O_0^{2-}$ Electron transfer to dissociatively adsorbed oxygen
4. Subsequent $O^{2-}$ migration from catalyst into membrane bulk.

Initial $O_2$ adsorption onto the perovskite transition metal B site proceeds end-on via lone pair electrons to give an α-type bond into the metal $d_z^2$ orbital. Simultaneously with this event, a back donation of $t_2$ electrons from the B lattice site to the oxygen antibonding π* orbital will occur. This synergistic effect is expected to result in strengthening the N—O bond and weakening the 0—0 bond. This process would be promoted most effectively for empty metal $e_g$ orbitals and filled metal $t_{2g}$ orbitals. Looking at $M^{2+}$, $M^{3+}$, $M^{4+}$ first row metals, this requirement would be met for the species $Fe^{2+}$, $Co^{3+}$ or $Ni^{4+}$ immobilized in the perovskite B lattice site of the general catalyst $BaCo_{1-x}M_xO_3$. Subsequent net electron transfer from the metal to the dissociatively adsorbed oxygen atom would be facilitated by the oxygen atom being energetically close to the perovskite electrocatalyst conduction band edge under conditions where this band edge is cathodic of that for the dissociatively adsorbed oxygen.

A necessary requirement will also be that adequate bulk electronic conductivity be present. Since band gaps for perovskite oxides are relatively large (3–5 eV), electron/hole mobility may be introduced via mixed valence sites:

$$M^{n+}—O—M^{(n+1)+} \leftrightarrows M^{(n+1)+}—O—M^{n+}$$

This is promoted by strong B site overlap with oxygen and B—O—B bond angles ≅180°.

For the reductive decomposition of $NO_x$ and $SO_x$, as well as for oxygen concentration, perovskites are again favored catalysts. In $NO_x$ decomposition, the catalyst must preferentially adsorb $NO_x$ over $O_2$ and permit the facile release of adsorbed O atoms. The first requirement is met by the use of the first row transition metal ions including Fe, Co, Ni, and Cu, as well as by group VIII metals such as Ru, Pt, or Pd in the B-site. The second requirement is met by the employment of basic or low melting metals in the A-site (Pb, Bi, or Sb, lanthanides or Group IA and IIQ dopants) as well as by the use of Ru or Group IB metals (Ag or Au) as a B-site dopant. These conditions are expected to produce generally weak M—O bonds, permitting the required surface and bulk mobility of oxygen ions. In addition, catalysts such as transition metals (Cu, Ag, Au, Pd, Pt, Rh, Ir, Os) supported on metal oxides, (e.g. $Fe_2O_3$, $Co_2O_3$, $Fe_3O_4$, NiO, $Ni_2O_3$, MnO, $MnO_2$) and prepared by various methods such as coprecipitation, impregnation, etc., are expected to be active.

$SO_x$ decomposition may be promoted in a similar manner to $NO_x$ decomposition, but the issue of sulfur tolerance arises. In that case, materials based on the Group VIB metals (Cr, Mo, and W) such as $WS_2$ or WC or on the Group VIII metals (Fe, Co, Ni, and Cu) such as the thioperovskites $ABS_3$ (where A is a lanthanide and B is a Group VIII metal), thiospinels $AB_2S_4$ (where A is a $2^+$ Group VIII ion and B is a $3^+$ Group VIII ion) or Chevrel phases $A_2MO_6S_8$ (where A is Fe, Co, Ni, Cu, Zn) are applicable. Similar requirements for oxygen reduction as for $NO_x$ reduction point to the use of similar perovskite catalysts.

$H_2S$ decomposition is similar to that of $SO_x$ decomposition. The preferred catalysts for this process are thiospinels $AB_2S_4$ (where A is a $2^+$ Group VIII ion and B is a $3^+$ Group VIII ion) or $WS_2$.

Previous work examining oxygen desorption using Temperature Programmed Desorption (TPD) from perovskite oxides have shown that two types of oxygen can become desorbed (Y. Teraoka, H.-M. Zhang and N. Yamazoe, Chem. Lett. 1367 (1955)). Here oxygen desorbed at lower temperatures, termed α oxygen, corresponds to adsorbed surface oxygen, and that desorbed at higher temperatures, designated β oxygen, is desorbed from lattice sites within the perovskite. TPD studies on oxygen desorption from perovskite oxides have been studied as a function of the nature and concentration of dopant atoms introduced into both the A- and B-sites. A brief discussion of some of these results and their relevance to selection of perovskite sites for oxygen evolution at intermediate temperatures is presented below.

TPD studies of oxygen evolution from perovskite oxides have shown the amount of α-oxygen desorbed from $Ln_{1-x}A_xMO_3$ (Ln is a lanthanide, A is an alkaline earth metal, and M is Co, Fe Ni Cr) was a function of x and hence the vacancy concentration was little affected by the nature of the β-site. These results suggested that α-oxygen occupied normally empty oxygen vacancy sites. The onset temperature where α-oxygen evolved was found to increase upon going from Ba to Sr to Ca in the A lattice site. Calculation of the average metal oxygen bond energy for the series $La_{1-x}A_xCoO_3$ (A is Ba, Sr and Ca) using the equation:

$$ABE = \frac{1}{12 \cdot m}\left(\Delta H_{A_mO_n} - m\Delta H_A - \frac{1}{n}D_{(O_2)}\right) + \frac{1}{6 \cdot m}(\Delta H_{B_mO_n} - m\Delta H_B)$$

where $\Delta H_{A_mO_n}$ and $\Delta H_{A_mO_n}$ are the heats of formation of the $A_mO_n$ and $B_mO_n$ oxides, respectively, $\Delta H_A$ and $\Delta H_B$ the heats of sublimation of the metals A and B, respectively, and $D_{(O_2)}$ is the oxygen dissociation energy, shows that the average metal-oxygen bond energy decreases in the order $La_{1-x}Ca_xCoO_3$, $La_{1-x}Sr_xCoO_3$, $La_{1-x}Ba_xCoO_3$. Thus, the α-oxygen desorption temperature is dependent on the average metal-oxygen bond strength at the perovskite surface. β-oxygen desorption is due to removal of oxygen from normal lattice sites accompanied by reduction of the formal B site oxidation cation by one. More recent work has shown that partial substitution of the B-site cation in $La_{0.6}Sr_{0.04}CoO_{0.8}M_{0.2}O_3$ with Cr, Mn, Fe, Ni, Ni and Cu affects both the onset temperature for and (Y. Teraoka, T. Nobunaya, N. Yamazoe, Chem.Lett. 503 (1988)) amount of α-oxygen evolved. The amount of α-oxygen evolved decreased in the order Cu>Fe>Ni>Mn>Cr.

Good oxygen evolution catalyst sites can occur when using perovskites possessing the general composition $BaCo_{1-x}M_xO_3$, where M is Fe, Cu or Ag and x is a number from 0 to 1. For these compositions the vacancy concentration has been maximized by total replacement of the $Ln^{3+}$ cation by the alkaline earth cation $Ba^{2+}$. Previous work (M. Crespin and K. W. Hall, J.Cat. 69, 359 (1981)) suggests that water decomposition at perovskite surfaces proceeds via reaction with oxygen vacancies. Additionally, selection of Ba over Sr or Ca leads to lower average metal-oxygen bond strengths and B site doping with Fe, Cu or Ag has been previously shown to enhance oxygen desorption.

As a consequence, perovskite electrocatalysts of formula $BaCo_{1-x}M_xO_3$, where M is Fe, Cu or Ag ($0.05 \leq x \leq 0.2$) are of significant interest for catalytic reactors of this invention. The predominance of Co in the B lattice site is compatible with both the oxygen dissociative adsorption and oxygen evolution step. Introduction of Fe, Cu and Ag into this lattice site will contribute to low overpotentials associated with the oxygen evolution reaction.

Metal oxide supported Ni can be employed on a membrane of this invention as a catalyst for $CO_2/CH_4$ oxidative reforming to synthesis gas. A number of these catalysts are described in the Examples and their performance is illustrated in the data of Table 4. The Ni:support ratio in these catalysts can vary from about 5:100 (5%) to about 100% Ni. Preferred Ni:support ratios are from about 1:10 (10% Ni) to 4:10 (40% Ni). Supports employed included inert supports (such as γ-$Al_2O_3$) and ionic and electronic conductors. Supports having Cr and Mn ions are expected to promote $CO_2$ absorption facilitating the reforming reaction. In the data given in the Table, CO selectivities for all catalysts tested were high, $H_2$:CO ratio is higher for 40% Ni catalysts than for 20% Ni catalysts. The preferred catalyst among those tested was Ni-supported LSM. These results indicate that supports containing Mn and/or Cr ions are useful for catalysts in this system. In addition, supports based on substitution of Cr and Mn into the metal oxide structure $La_{0.4}Sr_{1.6}GaFeO_{5.2}$ will be useful as catalyst supports in this system.

This invention has been described in detail with reference to a particular embodiment thereof, but it will be understood that various other modifications an be effected within the spirit and scope of this invention.

EXAMPLES

Example 1

Membrane Fabrication

All compounds were prepared from mixtures of the appropriate metal oxide(s) and metal carbonate(s) in the desired stoichiometries. Powders were placed in a small polyethylene container with an equal amount, by volume, of isopropyl alcohol. Several cylindrical yttria-stabilized zirconia (YSZ) grinding media were also added to the container. The resulting slurry was mixed thoroughly on a ball mill for several hours. The alcohol was then allowed to evaporate yielding a homogeneous mixture of the starting materials.

This homogeneous mixture was calcined to obtain the desired phase. Powders were placed in alumina crucibles and fired at temperatures up to about 1450° C. for 12 h in atmosphere. Upon cooling, the powders were ground to −100 mesh with a mortar and pestle. The ground powder was then analyzed by X-ray diffraction (XRD)to verify that the proper phase had been formed. Calcining was repeated, if necessary, until the desired single-phase material was obtained. If repeated calcination was required, the powders were thoroughly milled in between calcinations. XRD was performed using a Rigaku Miniflex X-Ray Spectrometer, Model CN2005 using $CU_{K\alpha}$ radiation (λA=1.542 Å). Scan speed was 2○(2θ)/min for this preliminary XRD and 0.5○ (2θ)/min for determination of lattice parameters.

Before pressing and sintering, the particle size of the powders was reduced by attrition. A Union Process Model 01 attritor with a YSZ tank and YSZ agitator arms was used for this process. In a typical attrition, about 1.5 lbs of 5 mm, spherical YSZ grinding media were placed in the tank. Isopropyl alcohol (about 120 mL) was then added to the tank followed by about 100 g of the −100 mesh powder. The powder was again reduced by attrition for 1 h, after which the alcohol was allowed to evaporate. XRD was again performed on the powder to ensure that the attrition procedure did not cause decomposition. No decomposition was observed for any materials. The XRD patterns showed considerable peak broadening, indicative of small particles. The particle size at this stage was believed to be submicron.

After attrition, powders were pressed into disks and sintered. The powder was mixed with a binder, e.g. a standard ceramic binder, such as Ceracer C640 (Shamrock), which is a polyethylene wax, with a mortar and pestle until a homogeneous mixture was obtained. Another suitable ceramic binder is methyl-cellulose. The binder/powder mixture (about 1 g) was placed in a 12.5 mm diameter die. The mixture was then pressed into disks at 15,000 psi for several minutes. These "green" disks were then placed into an $Al_2O_3$ crucible for sintering. Disks were packed with powder of the same material to ensure that the disks did not react with the crucible or sinter together. Disks were sintered in the crucible in atmosphere for 4 h at the appropriate sintering temperature for a given material from about 1300° C. to about 1450° C. to obtain sintered disks preferably of ≧90% theoretical density. Sintering temperature for a given material was determined empirically as is known in the art. Sintering temperatures used for representative materials are listed in Table 1. Typical ramp rates during sintering were 3° C./min for both heating and cooling cycles.

To form membranes of this invention, metal oxides or carbonates were combined in the desired stoichiometric ratio. For example, for $Sr_{1.2}La_{0.8}GaFeO_{5.4}$, 60.0 g $La_2O_3$, 40.7 g $SrCO_3$, 21.6 g $Ga_2O_3$ and 8.3 g $Fe_2O_3$ were combined. The resulting powder mixture was repeatedly calcined until it was single-phase material at temperatures up to 1400° C. The resulting single-phase brownmillerite material was pressed into a disk and sintered at 1450° C.

After sintering, one face of the sintered disk was examined by XRD to ensure that no decomposition had occurred. Additionally, an XRD pattern at a scan rate of 0.5° C. (2θ)/min was obtained on the powder prepared under identical conditions to determine lattice parameters. Lattice parameters were determined by fitting the observed pattern as is known in the art using commercially available Micro-index software (Materials Data, Inc., Livermore, Calif.). See C. Greaves et al. (1975;) supra.

A typical XRD pattern for a $Sr_{2-x}La_xGa_{2-y}Fe_yO_{5+x/2}$ material, where x=0.4 and y=1.8, is illustrated in FIG. 1. This pattern was fit to an orthorhombic unit cell, Pcmn, with a=5.534, b=15.68 and c=5.513 Å, similar to that observed for the brownmillerite compound $Sr_2Fe_2O_5$.

Membrane materials can also be shaped into tubes and closed-one-end tubes by isostatic pressing using appropriately shaped molds.

A commercial isostatic press (Fluition CP2-10-60) was employed to form closed-one-end tube membranes. This press is capable of operation to 54,000 psi to form tubes of ~4 cm outer diameter and 10 cm in length. Powder was prepared and reduced in particle size as discussed above. Binder (3%, C640 binder) was added to the powder. A rubber mold was fabricated in the desired outer shape of the tube. A small amount of powder sufficient to form the top end of the closed-end tube was introduced into the mold. A mandrel having the shape of the inner surface of the tube was then inserted into the mold.

A plug funnel was inserted into the top of the mold to allow powder to be added evenly around the mandrel. In particular, the funnel employed was designed so that it fit over the end of the mandrel and centered the mandrel in the mold. Powder was then poured into the mold via the funnel with vibration to ensure even packing. After packing, the mold was plugged and deaerated through the plug. The mold was inserted into the press. Pressure of 30,000 psi to about 40,000 psi was applied to the mold for about 2 m. After pressurization, the mold was removed and the green tube was removed from the mold. Very high green densities up to 80%, as measured by the Archimedes method, were obtained.

Green closed-one-end tubes were sintered by placing the tubes (closed-one-end down) in a crucible and inert small diameter beads of yttria-stabilized zirconia (commercially available) were placed around the tubes to keep the tubes straight during sintering. XRD of the tube surface after sintering indicated that no reaction had occurred between the beads and the tube. Straight closed-end tubes of sintered density typically between about 90% to 95% were prepared using this method with materials including $Sr_{1.6}La_{0.4}GaFeO_{5.2}$, $Sr_{1.7}La_{0.3}GaFeO_{5.15}$, and $Sr_{1.6}La_{0.4}Ga_{0.8}Fe_{1.2}O_{5.2}$.

Example 2

Determination of Oxygen Permeation Rates

A sintered $Sr_{1.2}La_{0.8}GaFeO_{5.4}$ membrane was incorporated into a two-zone catalytic membrane reactor with a Pyrex (Trademark, Corning) seal used to isolate the two zones. A generic reactor is illustrated in FIG. 10 and discussed above. No catalysts were coated on the membrane. The reducing section of the reactor was exposed to air and the oxidizing section of the reactor was exposed to the inert gas, He. Air was used rather than oxygen because the nitrogen in air could be used to assess any leaks in the membrane seal in the reactor apparatus used. The reactor was heated to 850° C. (as measured by a thermocouple at the furnace close to the reactor), and the amount of oxygen permeating through the membrane and any nitrogen leaks into the He was measured.

Determinations of oxygen and nitrogen concentrations in He were made by gas chromatography (Gow-Mac series 580 GC equipped with a ten foot Carbosphere column (Alltech)) maintained at ambient temperature. The rate of oxygen permeation for the $Sr_{1.2}La_{0.8}GaFeO_{5.4}$ membrane was determined to be 0.27 $cm^3$(STP)/min-$cm^2$ at this temperature for a 0.17 cm thick membrane.

Oxygen permeation rates can also be determined on catalyst-coated membranes. For example, both faces of a sintered disk of $Sr_{1.2}La_{0.8}FeGaO_{5.4}$ were coated with $La_{0.8}Sr_{0.2}CoO_{3-x}$ (LSC) which serves as an oxygen electrode. A slurry of about 1 g of LSC and about 1 g of butanediol was prepared and thoroughly mixed. The slurry was then painted onto the membrane disk surfaces and annealed at 900° C. for 1 h. This technique gave uniform coatings with strong adhesion. The oxygen permeation rate of a coated membrane 0.11 cm thick was determined to be 0.23 $cm^3$ (STP)/min-$cm^2$.

LSC is prepared by the glycine-nitrate method as described in L. A. Chick, L. R. Pederson, G. D. Maupin, J. L. Bates, L. E. Thomas, and G. J. Exarhos (1990) Mater. Lett. 10:6 and L. R. Pederson, G. D. Maupin, W. J. Weber, D. J. McReady and R. W. Stephens, (1991) Mater. Lett. 10:437. The following components were dissolved in $H_2O$ (75 mL): $Sr(NO_3)_2$ (2.12 g), $La(NO_3)_3 \cdot H_2O$ (16.6 g), $Co(NO_3)_2 \cdot H_2O$ (14.55 g), and glycine (9.01 g). The solution was transferred into a 3.8 L stainless steel beaker covered with a 100 mesh stainless steel screen to prevent loss of solids upon combustion. The beaker was heated on a hot plate until the mixture ignited. The powder was collected and subsequently annealed in air at 1100° C. for 2 h. The material prepared was examined by XRD to determine that it was single-phase.

Example 3

Ionic and Electronic Conductivities of Membrane Materials

Ionic conductivities were calculated from experimentally determined oxygen permeation rates (measured as described in Example 2 with LSC coated membranes) using the following equation (Y. Teraoka, H.-M. Zhang, S. Furukawa and N. Yamazoe (1985) Chem. Lett., 1743):

$$J = 1.72 \times 10^{-4} T \cdot \frac{\sigma_i}{d} \log \frac{P'_{O_2}}{P''_{O_2}}$$

where J is the oxygen permeation rate in $cm^3$(STP)/min-$cm^2$ of disk surface, T is the absolute temperature, d is the sintered disk thickness (cm) and P'($O_2$) and P"($O_2$) are the oxygen partial pressures on the air and He sides, respectively, on either side of the membranes. For the values listed in Table 2 above P'($O_2$) and P"($O_2$) were taken as 0.21 and $1 \times 10^{-3}$ atm, respectively and permeation measurements were performed in the temperature range 750° C.–900° C.

Total conductivity, i.e., the sum of electronic and ionic conductivity, of membranes was measured using the van der Pauw four-probe method. See L. J. van der Pauw (1958) Philips Res. Rep. 13:1. Four electrodes were attached to the perimeter of the sintered disk surface. A current was applied across two contiguous electrodes and the voltage measured across the remaining two electrodes. Typical currents used were between 1–30 mA. Conductivity was calculated from the applied current and measured voltages according to the following equation:

$$\sigma = \frac{\ln 2}{\pi d}\left(\frac{I}{V}\right)$$

where I is the applied current, V is the measured voltage and d is the disk thickness. The contact resistance of each electrode was measured and found to be similar so no geometrical factor was required. Measurements of total conductivity were made in He, methane and air over the temperature range 750° C.–900° C.

Ionic and total conductivities of exemplary membrane materials are given in Table 2.

Example 4

Long Term Stability Test

One side of a sintered disk of $Sr_{1.7}La_{0.3}GaFeO_{5.15}$ was coated with Ni to serve as the partial oxidation catalyst. The other side of the disk was coated with LSC which served as the oxygen reduction catalyst. The disk was inserted in the reactor shown in FIG. 10, such that the Ni-coated side was exposed to methane. Methane in He (about 70%) was introduced into the reactor as shown in FIG. 10, contacting the Ni-coated side of the disk. Oxygen in He (about 70%) was introduced into the reactor as shown in FIG. 10, contacting the LSC-coated side of the disk. The reactor was kept at 900° C. Synthesis gas with a ratio of $H_2$:CO of 1.6–1.8 (with a few percent of $CO_2$) was produced at a rate of 6–8 ml/min cm² disk surface. The sintered disk material was stable for >1000 hr under these operating conditions. Further, the sintered disk remained mechanically stable, i.e. it did not crumble or crack. FIG. 2 is a graph of the rate of synthesis gas production in this reactor over 1000 hr. X-ray diffraction after the experiment showed that the disk maintained the proper structure. No impurities due to disk decomposition were observed.

Example 5

Tubular Reactor Experiment

Figures 11A, 11B:
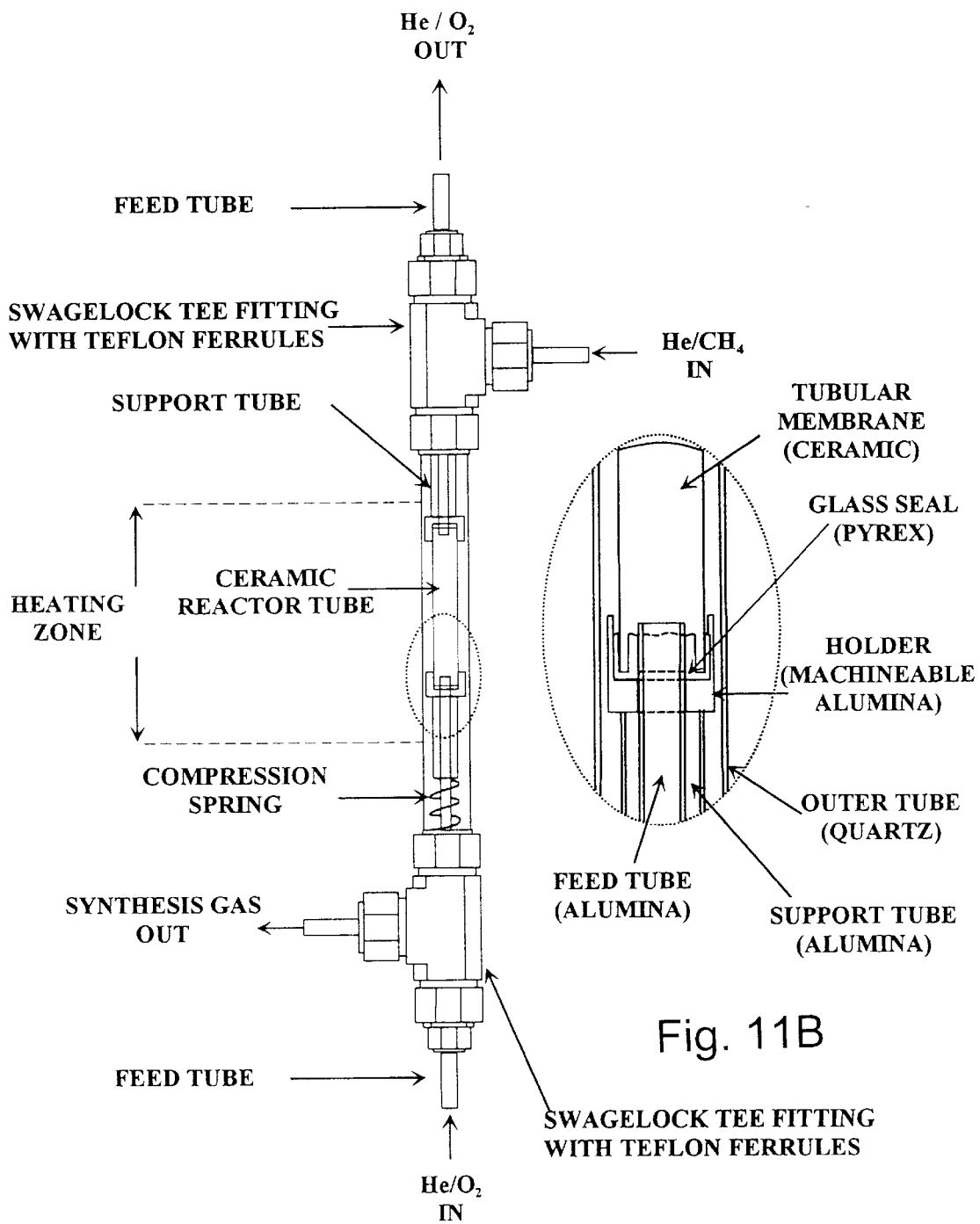
FIGS. 11A and 11B depict a drawing of a tubular membrane reactor employed in assessing membrane materials of this invention. The reactor is shown as illustrated for introduction of $CH_4$ (as a mixture with inert gas He) and $O_2$ (as a mixture with inert gas He). $CH_4$ is introduced into the outer tubes contacting the outer surface of the reactor membrane tube. $O_2$ is introduced through a feed tube to the inside of the tubular membrane.

A ceramic reactor tube, see FIG. 11, was fabricated from the compound $Sr_{1.6}La_{0.4}GaFeO_{5.2}$. The inside of the tube was coated with Ni and the outside of the tube was coated with LSC. Methane in He (about 70%) was flowed (10 mL/min) inside the tube and oxygen in He (about 70%) was flowed (10 mL/min) past the outside of the tube. The reactor was held at 900° C. Synthesis gas with a ratio of $H_2$:CO of 1.8 (and a small amount of $CO_2$)was produced at a rate of 0.7 mL/min cm² of membrane surface.

Example 6

$CO_2$ and $CH_4$ Oxidative Reforming to Synthesis Gas

Brownmillerite membrane materials were characterized for performance in catalytic membrane reactors. Sintered disks were prepared as described above, a Ni coating was employed as the partial oxidation catalyst and an LSC coating was employed as the reduction catalyst. LSC was prepared and applied to one face of the membrane surface as described above. Nickel was applied to the other membrane face using Ni epoxy (Aremco Products, Inc.). Coated membranes were inserted into the apparatus illustrated in FIG. 10, the Ni-coated surface is the oxidation surface in contact with the reactant gas, here methane or methane/$CO_2$ mixtures in inert gas (He) and LSC-coated surface is the reduction surface in contact with the oxygen-containing gas, here $O_2$ in inert gas (He). Experiments were performed with a feed composition 70% $CH_4$ in He. When $CO_2$ was added to the feed flow, it replaced He so that a constant 10 mL total feed flow rate with 70% $CH_4$ was maintained. Hydrogen, CO, $CO_2$ and $CH_4$ were analyzed by GC employing a six foot Carbosphere column (Alltech) maintained at 80° C. Results are summarized in the Table 3 where $H_2$, CO and $CO_2$ (measured in terms of ml/min cm²) are assessed as a function of reactor temperature and $CO_2$ content of feed. Where the $CO_2$:$CH_4$ ratio is listed as zero, the feed was $CH_4$ in He. Selectivity of the reactor for CO compared to $CO_2$ was measured for $CH_4$ reactant. The ratio of $H_2$:$CO_2$ produced is also listed.

Example 7

Supported Ni Catalysts for Methane Reforming to Synthesis Gas

Several supported Ni partial oxidation catalysts were employed for methane partial oxidation in a catalytic membrane reactor. $Sr_{1.6}La_{0.4}GaFeO_{5.2}$ was employed as the membrane material and LSC was coated on one surface of the membrane as the reduction catalyst. Oxidation catalysts were coated onto the membrane surface in a manner similar to that for LSC. The feed composition and product composition were analyzed using GC as described above. Mass balance was calculated based on the measured feed and product composition. Carbon deposition, as the percent of total carbon in the input stream was calculated based on the difference between carbon input as $CH_4$ and $CO_2$ and the amount of carbon in the product stream in the form of CO, $CO_2$ and $CH_4$.

Ni supported on metal oxides was prepared by impregnation followed by reduction in hydrogen. An aqueous solution (10 mL of water)of a selected amount of $Ni(NO_3)_2$ was prepared. The support material (10 g) was added to the solution and the mixture dried at 90° C. for 12 h. The amount of $Ni(NO_3)_2$ included in the solution was dependent upon the Ni:support (w:w) ratio desired in the catalyst. The resulting powder was then ground thoroughly and placed in an $Al_2O_3$ boat. The boat was placed in a tube furnace and 10% hydrogen in Ar flowed over the boat. The reduced powder was heated at 600° C. for 6 h and cooled to room temperature. XRD was performed on the catalyst to ensure that Ni ion was reduced to Ni metal and that the support material had not decomposed during this process. XRD analysis indicated no evidence of incomplete reduction or support decomposition in any of the catalysts prepared.

Several different metal oxide support materials were used. Inert supports, such as $\gamma$-$Al_2O_3$, $La_2O_3$, ionic and electronic conductors ($La_{0.76}Sr_{0.24}CrO_3$(LSCr), $La_{0.8}Sr_{0.2}MnO_3$ (LSM), and $Sr_{1.6}La_{0.4}GaFeO_{5.2}$ were employed. Support powders were either available commercially or prepared as follows: LSM was prepared by the glycine nitrate method as described above for LSC, and $Sr_{1.6}La_{0.4}GaFeO_{5.2}$ powder was prepared from oxides and reduced in particle size by attrition as described above for synthesis of membrane materials. Experimental results are summarized in Table 4. Overall productivity as the sum of hydrogen and CO produced, $H_2$:CO ratio, CO selectivity and carbon deposition were assessed.

Rhodium is known as an active metal for the $CO_2$ reforming reaction (J. R. Rostrup-Nielson and J.-H. Bak Hansen (1993) J. Catalysis 144:38). A series of catalysts having 5% (by weight) Rh dispersed on different supports were also fabricated and characterized for activity toward combined partial oxidation and $CO_2$ reforming reactions in membrane reactors. These supported Rh catalysts were prepared in the same manner as supported Ni catalysts described above except that hydrated $Rh(NO_3)_3$ was used as the metal source. For example, a catalyst having Rh (5% by weight) on $\alpha$-$Al_2O_3$ heated for 6 h at 600° C. in 10%$H_2$/Ar was shown by XRD to consist of Rh in the form of Rh metal. In Table 4, the results of synthesis gas production are presented. In these experiments the reduction catalyst was LSC.

TABLE 1

Summary of Preparation Conditions and Structural Parameters for Mixed Conducting Membranes Investigated To Date in This Program

| Membrane Composition | Sintering Temperature (° C.) | Sintered Density (g/cm³) | Theoretical Density | Lattice Parameters a Å | b Å | c Å | Cell Volume (Å³) |
|---|---|---|---|---|---|---|---|
| $Sr_{1.4}La_{0.6}GaFeO_{5.3}$ | 1300 | 5.1 | 89% | 5.547 | 15.69 | 5.526 | 481 |
| $Sr_{1.6}La_{0.4}Ga_{1.2}Fe_{0.8}O_{5.2}$ | 1260 | 5.3 | 97% | 5.720 | 15.74 | 5.560 | 501 |
| $Sr_{1.6}La_{0.4}GaFeO_{5.2}$ | 1350 | 5.1 | 93% | 5.719 | 15.71 | 5.550 | 499 |
| $Sr_{1.6}La_{0.4}Ga_{0.8}Fe_{1.2}O_{5.2}$ | 1450 | 4.7 | 86% | 5.569 | 15.80 | 5.541 | 487 |
| $Sr_{1.6}La_{0.4}Ga_{0.6}Fe_{1.4}O_{5.2}$ | 1375 | 4.8 | 88% | 5.542 | 15.67 | 5.520 | 479 |
| $Sr_{1.6}La_{0.4}Ga_{0.4}Fe_{1.6}O_{5.2}$ | 1300 | 5.0 | 91% | 5.534 | 15.68 | 5.513 | 478 |
| $Sr_{1.6}La_{0.4}Ga_{0.2}Fe_{1.8}O_{5.2}$ | 1360 | 5.1 | 94% | 5.534 | 15.56 | 5.497 | 473 |
| $Sr_{1.6}La_{0.4}Fe_2O_{5.2}$ | 1375 | 5.2 | 94% | 5.523 | 15.59 | 5.476 | 471 |
| $Sr_{1.7}La_{0.3}GaFeO_{5.15}$ | 1290 | 5.1 | 95% | 5.610 | 15.80 | 5.570 | 494 |
| $Sr_{1.7}La_{0.3}Ga_{0.8}Fe_{1.2}O_{5.15}$ | 1375 | 5.3 | 100% | 5.708 | 15.65 | 5.530 | 494 |
| $Sr_{1.7}La_{0.3}Ga_{0.6}Fe_{1.4}O_{5.15}$ | 1375 | 5.3 | 99% | 5.640 | 15.67 | 5.530 | 489 |
| $Sr_{1.7}La_{0.3}Ga_{0.4}Fe_{1.6}O_{5.15}$ | 1375 | 5.3 | 92% | 5.622 | 15.72 | 5.550 | 491 |
| $Sr_{1.7}La_{0.3}Ga_{0.2}Fe_{1.8}O_{5.15}$ | 1400 | 5.2 | 95% | 5.515 | 15.56 | 5.486 | 471 |
| $Sr_{1.8}La_{0.2}GaFeO_{5.1}$ | 1300 | 4.6 | 88% | 5.728 | 15.74 | 5.556 | 501 |
| $Sr_{1.8}La_{0.2}Ga_{0.4}Fe_{1.6}O_{5.1}$ | 1450 | 5.0 | 92% | 5.516 | 15.60 | 5.504 | 474 |
| $Sr_{1.8}La_{0.2}Ga_{0.2}Fe_{1.8}O_{5.1}$ | 1450 | 5.0 | 98% | 5.657 | 15.84 | 5.566 | 499 |

TABLE 2

Ionic and Electronic Conductivities for Mixed Conducting Brownmmillerite Membrane Disks

| Membrane Composition | Temperature (° C.) | $\alpha_{ion}$ (S/cm) | $\alpha_{total}$ (S/cm) CH$_4$ | He | Air | (S/cm) | $t_i$ |
|---|---|---|---|---|---|---|---|
| $Sr_{1.6}La_{0.4}Ga_{1.2}Fe_{0.8}O_{5.2}$ | 750 | 0.001 | 0.23 | 0.19 | 1.14 | 0.19 | 1 |
|  | 800 | 0.001 | 0.20 | 0.24 | 1.12 | 0.24 | 1 |
|  | 850 | 0.001 | 0.16 | 0.28 | 1.10 | 0.28 | 1 |
|  | 900 | 0.001 | 0.08 | 0.29 | 1.06 | 0.29 | 1 |
| $Sr_{1.6}La_{0.4}Ga_{0.6}Fe_{1.4}O_{5.2}$ | 750 | 0.046 | 0.31 | 1.78 | 15.o | 1.73 | 0.97 |
|  | 800 | 0.065 | 0.27 | 1.98 | 14.2 | 1.92 | 0.97 |
|  | 850 | 0.076 | 0.23 | 2.16 | 12.8 | 2.08 | 0.96 |
|  | 900 | 0.089 | 0.18 | 2.26 | 11.6 | 2.17 | 0.96 |
| $Sr_{1.6}La_{0.4}Ga_{0.2}Fe_{1.8}O_{5.2}$ | 750 | 0.014 | — | 2.41 | 14.4 | 2.40 | 0.99 |
|  | 800 | 0.020 | 0.62 | 3.49 | 23.4 | 3.47 | 0.99 |
|  | 850 | 0.031 | 0.17 | 1.41 | 8.50 | 1.38 | 0.98 |
|  | 900 | 0.058 | 0.45 | 0.91 | 7.50 | 0.85 | 0.94 |
| $Sr_{1.6}La_{0.4}Fe_2O_{5.2}$ | 750 | 0.126 | 0.51 | 37.4 | 48.1 | 37.3 | 1 |
|  | 800 | 0.202 | 0.75 | 33.7 | 112.3 | 33.5 | 0.99 |
|  | 850 | 0.300 | 1.23 | 33.7 | 84.2 | 33.4 | 0.99 |
|  | 900 | 0.414 | 1.68 | 30.6 | 67.4 | 30.2 | 0.99 |
| $Sr_{1.7}La_{0.3}GaFeO_{5.15}$ | 750 | 0.019 | 0.38 | 0.41 | 0.14 | 0.39 | 0.95 |
|  | 800 | 0.031 | 0.60 | 0.39 | 0.16 | 0.36 | 0.92 |
|  | 850 | 0.045 | 0.62 | 0.39 | 0.19 | 0.35 | 0.88 |
|  | 900 | 0.043 | 0.63 | 0.22 | 0.22 | 0.18 | 0.80 |
| $Sr_{1.7}La_{0.3}Ga_{0.8}Fe_{1.2}O_{5.15}$ | 750 | 0.014 | 0.57 | 0.45 | 5.45 | 0.44 | 0.97 |
|  | 800 | 0.020 | 1.05 | 0.48 | 5.98 | 0.46 | 0.96 |
|  | 850 | 0.026 | 0.90 | 0.59 | 5.51 | 0.56 | 0.96 |
|  | 900 | 0.033 | 1.25 | 0.69 | 5.16 | 0.66 | 0.95 |
| $Sr_{1.7}La_{0.3}Ga_{0.6}Fe_{1.4}O_{5.15}$ | 750 | 0.087 | 0.31 | 2.93 | 16.6 | 2.84 | 0.97 |
|  | 800 | 0.095 | 0.37 | 2.60 | 14.2 | 2.51 | 0.96 |
|  | 850 | 0.119 | 0.55 | 2.35 | 12.5 | 2.23 | 0.95 |
|  | 900 | 0.143 | 0.88 | 2.32 | 1o.5 | 2.18 | 0.94 |
| $Sr_{1.7}La_{0.3}Ga_{0.4}Fe_{1.6}O_{5.2}$ | 750 | 0.023 | 0.06 | 13.9 | 14.2 | 13.9 | 1 |
|  | 800 | 0.034 | 0.08 | 14.5 | 14.9 | 14.5 | 1 |
|  | 850 | 0.046 | 0.11 | 15.2 | 15.9 | 15.2 | 1 |
|  | 900 | 0.060 | 0.17 | 15.9 | 14.2 | 15.8 | 1 |

TABLE 2-continued

Ionic and Electronic Conductivities for Mixed Conducting Brownmmillerite Membrane Disks

| Membrane Composition | Temperature (° C.) | $\alpha_{ion}$ (S/cm) | $\alpha_{total}$ (S/cm) | | | (S/cm) | $t_i$ |
|---|---|---|---|---|---|---|---|
| | | | $CH_4$ | He | Air | | |
| $Sr_{1.7}La_{0.3}Ga_{0.2}Fe_{1.8}O_{5.2}$ | 750 | 0.017 | 0.60 | 7.32 | 5.96 | 7.30 | 1 |
| | 800 | 0.025 | 1.49 | 7.49 | 5.11 | 7.47 | 1 |
| | 850 | 0.034 | 2.05 | 7.85 | 6.71 | 7.82 | 1 |
| | 900 | 0.045 | 2.73 | 8.05 | 5.37 | 8.01 | 0.99 |
| $Sr_{1.8}La_{0.2}GaFeO_{5.1}$ | 750 | 0.042 | 0.31 | 0.89 | 22.7 | 0.85 | 0.95 |
| | 800 | 0.059 | 0.55 | 0.78 | 7.91 | 0.72 | 0.92 |
| | 850 | 0.083 | 0.23 | 0.49 | 5.85 | 0.41 | 0.83 |
| | 900 | 0.191 | 0.67 | 0.73 | 3.69 | 0.54 | 0.74 |
| $Sr_{1.8}La_{0.2}Ga_{0.4}Fe_{1.6}O_{5.1}$ | 750 | — | 2.20 | 3.51 | 75.4 | — | — |
| | 800 | 0.026 | 1.57 | 3.71 | 56.6 | 3.68 | 0.99 |
| | 850 | 0.036 | 2.15 | 3.93 | 50.3 | 3.89 | 0.99 |
| | 900 | 0.062 | 1.97 | 4.19 | 37.7 | 4.13 | 0.99 |
| $Sr_{1.8}La_{0.2}Ga_{0.2}Fe_{1.8}O_{5.1}$ | 750 | 0.015 | 0.76 | 0.05 | 23.9 | 0.04 | 0.70 |
| | 800 | 0.025 | 0.86 | 0.17 | 19.4 | 0.15 | 0.85 |
| | 850 | 0.043 | 0.71 | 0.25 | 17.3 | 0.21 | 0.83 |
| | 900 | 0.069 | 1.01 | 0.33 | 13.5 | 0.26 | .79 |

TABLE 3

Summary of Results Obtained for Mixed Conducting Brownmillerite Disk Membrane Reactors

| Membrane Composition | Temperature (° C.) | Feed $CO_2:CH_4$ | Product | | | | CO Selectivity |
|---|---|---|---|---|---|---|---|
| | | | $H_2$ | CO | $CO_2$ ml/min cm² | $H_2:CO$ | |
| $Sr_{1.4}La_{0.6}GaFeO_{5.3}$ | 800 | 0 | 5.12 | 3.30 | 0.02 | 1.6 | 0.99 |
| | 800 | 0.14 | 4.94 | 8.00 | 0.12 | 0.6 | — |
| | 800 | 0.28 | 4.29 | 8.72 | 0.12 | 0.6 | — |
| | 800 | 0.43 | 4.22 | 5.02 | 0.21 | 0.8 | — |
| | 850 | 0 | 5.74 | 4.57 | 0.00 | 1.3 | 1.00 |
| | 850 | 0.14 | 5.02 | 9.18 | 0.07 | 0.6 | — |
| | 850 | 0.28 | 4.77 | 9.91 | 0.06 | 0.5 | — |
| | 850 | 0.43 | 4.36 | 11.27 | 0.08 | 0.5 | — |
| | 900 | 0 | 10.44 | 2.75 | 1.07 | 3.8 | 0.75 |
| | 900 | 0.14 | 7.89 | 17.03 | 0.07 | 0.5 | — |
| | 900 | 0.28 | 7.82 | 18.74 | 0.06 | 0.4 | — |
| | 900 | 0.43 | 4.96 | 24.00 | 0.07 | 0.2 | — |
| $Sr_{1.6}La_{0.4}GaFeO_{5.2}$ | 800 | 0 | 1.85 | 0.94 | 0.25 | 2.0 | 0.80 |
| | 800 | 0.05 | 1.26 | 0.61 | 1.02 | 2.1 | — |
| | 800 | 0.12 | 0.73 | 0.34 | 1.71 | 2.3 | — |
| | 850 | 0 | 2.36 | 1.16 | 0.17 | 2.0 | 0.90 |
| | 850 | 0.05 | 1.53 | 0.77 | 0.89 | 2.0 | — |
| | 850 | 0.12 | 1.12 | 0.49 | 1.66 | 2.3 | — |
| | 850 | 0.27 | 0.32 | 0.28 | 3.17 | 0.8 | — |
| | 900 | 0 | 2.97 | 1.34 | 0.10 | 2.2 | 0.90 |
| | 900 | 0.05 | 1.82 | 0.93 | 0.73 | 2.0 | — |
| | 900 | 0.12 | 1.92 | 1.11 | 1.42 | 1.7 | — |
| | 900 | 0.27 | 1.59 | 1.22 | 2.85 | 1.3 | — |
| $Sr_{1.6}La_{0.4}Ga_{0.4}Fe_{1.0}O_{5.2}$ | 800 | 0 | 1.40 | 1.34 | 1.29 | 1.7 | 0.5 |
| | 800 | 0.14 | 1.45 | 1.38 | 3.14 | 1.1 | — |
| | 800 | 0.28 | 0.97 | 1.07 | 5.04 | 0.9 | — |
| | 800 | 0.43 | 0.93 | 1.19 | 8.95 | 0.8 | — |
| | 850 | 0 | 1.24 | 0.63 | 0.48 | 2.0 | 0.06 |
| | 850 | 0.14 | 2.31 | 3.07 | 3.76 | 0.8 | — |
| | 850 | 0.28 | 1.82 | 2.44 | 3.75 | 0.8 | — |
| | 850 | 0.43 | 1.47 | 2.52 | 7.85 | 0.6 | — |
| | 900 | 0 | 3.34 | 2.06 | 0.67 | 1.6 | 0.70 |
| | 900 | 0.14 | 4.25 | 5.43 | 5.49 | 0.8 | — |
| | 900 | 0.28 | 4.37 | 6.39 | 4.15 | 0.7 | — |
| | 900 | 0.43 | 3.55 | 7.57 | 8.71 | 0.5 | — |
| $Sr_{1.6}La_{0.4}Ga_{0.6}Fe_{1.4}O_{5.2}$ | 800 | 0 | 3.24 | 1.20 | 0.61 | 2.8 | 0.7 |
| | 800 | 0.04 | 3.32 | 1.60 | 1.49 | 2.1 | — |
| | 800 | 0.13 | 2.91 | 1.44 | 2.40 | 2.0 | — |
| | 800 | 0.43 | 1.07 | 0.56 | 4.65 | 1.8 | — |
| | 850 | 0 | 3.60 | 1.51 | 0.66 | 2.4 | 0.7 |
| | 850 | 0.04 | 3.58 | 1.53 | 1.65 | 2.3 | — |
| | 850 | 0.13 | 3.03 | 1.39 | 2.59 | 2.2 | — |
| | 850 | 0.43 | 1.20 | 0.67 | 4.49 | 1.8 | — |
| | 900 | 0 | 3.58 | 1.79 | 0.74 | 2.0 | 0.7 |

TABLE 3-continued

Summary of Results Obtained for Mixed Conducting Brownmillerite Disk Membrane Reactors

| Membrane Composition | Temperature (° C.) | Feed $CO_2:CH_4$ | $H_2$ | Product CO ml/min $cm^2$ | Product $CO_2$ ml/min $cm^2$ | Product $H_2:CO$ | CO Selectivity |
|---|---|---|---|---|---|---|---|
| | 900 | 0.04 | 3.18 | 1.64 | 1.71 | 1.9 | — |
| | 900 | 0.13 | 2.72 | 1.36 | 2.81 | 2.0 | — |
| | 900 | 0.43 | 1.08 | 0.68 | 4.60 | 1.6 | — |
| $Sr_{1.8}La_{0.2}GaFeO_{5.1}$ | 800 | 0 | 5.73 | 0.87 | 0.02 | 6.6 | 1.0 |
| | 800 | 0.13 | 4.80 | 2.54 | 1.14 | 1.9 | — |
| | 800 | 0.72 | 4.06 | 2.81 | 1.47 | 1.4 | — |
| | 850 | 0 | 6.38 | 1.32 | 0.02 | 4.8 | 1.0 |
| | 850 | 0.05 | 6.62 | 2.19 | 0.44 | 3.0 | — |
| | 850 | 0.13 | 5.12 | 3.22 | 0.93 | 1.6 | — |
| | 850 | 0.72 | 5.34 | 3.23 | 1.21 | 1.7 | — |
| | 900 | 0 | 7.69 | 2.12 | 0.02 | 3.6 | 1.0 |
| | 900 | 0.05 | 7.34 | 2.71 | 0.36 | 2.7 | — |
| | 900 | 0.13 | 5.84 | 3.65 | 0.75 | 1.6 | — |
| | 900 | 0.72 | 5.43 | 3.59 | 1.00 | 1.5 | — |
| $Sr_{1.7}La_{0.3}GaFeO_{5.15}$ | 800 | 0 | 3.58 | 1.42 | 0.16 | 2.5 | 0.9 |
| | 800 | 0.06 | 2.13 | 1.34 | 1.42 | 1.6 | — |
| | 800 | 0.15 | 2.23 | 1.46 | 2.27 | 1.5 | — |
| | 800 | 0.25 | 2.30 | 1.46 | 3.21 | 1.6 | — |
| | 850 | 0 | 3.83 | 1.73 | 0.19 | 2.2 | 0.9 |
| | 850 | 0.06 | 2.87 | 1.94 | 1.21 | 1.5 | — |
| | 850 | 0.15 | 2.84 | 2.03 | 1.93 | 1.4 | — |
| | 850 | 0.25 | 3.29 | 2.50 | 2.58 | 1.3 | — |
| | 900 | 0 | 4.03 | 2.06 | 0.24 | 2.0 | 0.9 |
| | 900 | 0.06 | 3.34 | 2.61 | 1.00 | 1.3 | — |
| | 900 | 0.15 | 3.63 | 2.82 | 1.61 | 1.3 | — |
| | 900 | 0.25 | 4.13 | 2.93 | 2.14 | 1.4 | — |
| $Sr_{1.6}La_{0.4}Fe_2O_{5.2}$ | 800 | 0 | 1.12 | 0.24 | 0.02 | 4.8 | 0.9 |
| | 800 | 0.05 | 1.15 | 0.68 | 0.83 | 1.7 | — |
| | 800 | 0.09 | 1.42 | 0.69 | 0.90 | 2.1 | — |
| | 850 | 0 | 1.93 | 0.28 | 0.01 | 6.8 | 1.0 |
| | 850 | 0.05 | 1.16 | 0.54 | 0.82 | 2.2 | — |
| | 850 | 0.09 | 2.08 | 1.11 | 0.67 | 1.9 | — |
| | 900 | 0 | 2.56 | 0.35 | 0.01 | 7.3 | 1.0 |
| | 900 | 0.05 | 1.42 | 0.63 | 0.71 | 2.3 | — |
| | 900 | 0.09 | 3.18 | 1.62 | 0.40 | 2.0 | — |
| $Sr_{1.6}La_{0.4}Ga_{0.2}Fe_{1.8}O_{5.2}$ | 800 | 0 | 4.46 | 1.39 | 0.05 | 3.2 | 1.0 |
| | 800 | 0.08 | 4.63 | 1.73 | 0.64 | 2.7 | — |
| | 800 | 0.14 | 2.02 | 3.30 | 0.81 | 0.6 | — |
| | 800 | 0.24 | 3.04 | 3.06 | 1.22 | 1.0 | — |
| | 850 | 0 | 5.21 | 1.73 | 0.03 | 3.0 | 1.0 |
| | 850 | 0.08 | 5.43 | 2.41 | 0.38 | 2.3 | — |
| | 850 | 0.14 | 5.64 | 2.54 | 0.45 | 2.2 | — |
| | 850 | 0.24 | 3.58 | 3.61 | 0.85 | 1.0 | — |
| | 900 | 0 | 6.09 | 1.89 | 0.01 | 3.3 | 1.0 |
| | 900 | 0.08 | 5.73 | 2.88 | 0.25 | 2.0 | — |
| | 900 | 0.14 | 6.28 | 2.89 | 0.30 | 2.2 | — |
| | 900 | 0.24 | 4.04 | 4.04 | 0.60 | 1.0 | — |
| $Sr_{1.7}La_{0.3}Ga_{0.2}Fe_{1.8}O_{5.15}$ | 800 | 0 | 5.06 | 0.63 | 0.02 | 8.0 | 1.0 |
| | 800 | 0.08 | 4.76 | 1.34 | 11.33 | 3.6 | — |
| | 800 | 0.28 | 4.12 | 3.43 | 2.05 | 1.2 | — |
| | 850 | 0 | 6.47 | 0.77 | 0.01 | 8.4 | 1.0 |
| | 850 | 0.08 | 5.57 | 1.52 | 0.51 | 3.7 | — |
| | 850 | 0.28 | 4.02 | 3.16 | 1.87 | 1.3 | — |
| | 900 | 0 | 6.93 | 1.09 | 0 | 6.7 | 1.0 |
| | 900 | 0.08 | 6.48 | 1.90 | 0.25 | 3.4 | — |
| | 900 | 0.28 | 4.40 | 3.12 | 1.53 | 1.4 | — |
| $Sr_{1.8}La_{0.2}Ga_{0.2}Fe_{1.8}O_{5.1}$ | 800 | 0 | 6.42 | 2.03 | 0.1 | 3.2 | 1.0 |
| | 800 | 0.10 | 4.53 | 3.09 | 0.67 | 1.5 | — |
| | 800 | 0.17 | 3.89 | 3.42 | 0.94 | 1.2 | — |
| | 850 | 0 | 8.13 | 1.97 | 0.04 | 4.1 | 1.0 |
| | 850 | 0.10 | 5.76 | 4.18 | 0.28 | 1.4 | — |
| | 850 | 0.17 | 5.11 | 4.66 | 0.53 | 1.1 | — |
| | 900 | 0 | 8.62 | 1.60 | 0.01 | 5.5 | 1.0 |
| | 900 | 0.10 | 5.82 | 4.59 | 0.18 | 1.3 | — |
| | 900 | 0.17 | 5.63 | 5.84 | 0.35 | 1.0 | — |
| $Sr_{1.6}La_{0.4}Ga_{0.8}Fe_{1.2}O_{5.2}$ | 800 | 0 | 5.16 | 2.62 | 0.12 | 2.0 | 1.0 |
| | 800 | 0.12 | 4.84 | 3.51 | 1.12 | 14 | — |
| | 800 | 0.20 | 4.43 | 2.227 | 1.55 | 2.0 | — |
| | 800 | 0.55 | 3.97 | 3.71 | 2.75 | 1.1 | — |
| | 850 | 0 | 6.18 | 2.17 | 0.03 | 2.8 | 1.0 |
| | 850 | 0.12 | 5.70 | 3.78 | 0.85 | 1.5 | — |
| | 850 | 0.20 | 5.69 | 2.98 | 1.30 | 1.9 | — |

TABLE 3-continued

Summary of Results Obtained for Mixed Conducting Brownmillerite Disk Membrane Reactors

| Membrane Composition | Temperature (° C.) | Feed CO$_2$:CH$_4$ | H$_2$ | Product CO ml/min cm$^2$ | CO$_2$ | H$_2$:CO | CO Selectivity |
|---|---|---|---|---|---|---|---|
| | 850 | 0.55 | 4.24 | 4.02 | 2.25 | 1.1 | — |
| | 900 | 0 | 5.71 | 2.56 | 0.03 | 2.2 | 1.0 |
| | 900 | 0.12 | 5.30 | 4.63 | 0.68 | 1.1 | — |
| | 900 | 0.20 | 5.42 | 3.32 | 1.06 | 1.6 | — |
| | 900 | 0.55 | 4.58 | 4.55 | 1.86 | 1.0 | — |
| Sr$_{1.7}$La$_{0.3}$Ga$_{0.6}$Fe$_{1.4}$O$_{5.15}$ | 800 | 0 | 1.76 | 0.68 | 0.59 | 2.6 | 0.5 |
| | 800 | 0.08 | 2.11 | 0.90 | 1.80 | 2.4 | — |
| | 800 | 0.13 | 1.70 | 0.99 | 2.63 | 1.7 | — |
| | 850 | 0 | 2.76 | 1.25 | 0.45 | 2.2 | 0.7 |
| | 850 | 0.08 | 2.71 | 1.47 | 1.52 | 1.8 | — |
| | 850 | 0.13 | 1.34 | 0.93 | 2.56 | 1.4 | — |
| | 850 | 0.19 | 2.37 | 1.60 | 3.51 | 1.5 | — |
| | 900 | 0 | 3.22 | 1.58 | 0.44 | 2.1 | 0.8 |
| | 900 | 0.08 | 2.65 | 1.47 | 1.50 | 1.8 | — |
| | 900 | 0.13 | 1.94 | 1.19 | 2.28 | 1.6 | — |
| | 900 | 0.18 | 1.93 | 1.41 | 3.07 | 1.4 | — |

TABLE 4

Summary of Results Obtained for Supported Catalysts on Sr$_{1.6}$La$_{0.4}$GaFeO$_{5.2}$ Membrane Disk Reactors

| Catalyst Composition | Temperature (° C) | Feed CO$_2$:CH$_4$ | H$_2$ | CO | Product CO$_2$ ml/min cm$^2$ | H$_2$:CO | CO Selectivity | Carbon Deposition |
|---|---|---|---|---|---|---|---|---|
| Ni (100%) | 800 | 0 | 1.85 | 0.94 | 0.25 | 2.0 | 0.80 | 12.3 |
| | 800 | 0.05 | 1.26 | 0.61 | 1.02 | 2.1 | — | 12.8 |
| | 800 | 0.12 | 0.73 | 0.34 | 1.71 | 2.3 | — | 10.1 |
| | 850 | 0 | 2.36 | 1.16 | 0.17 | 2.0 | 0.90 | 14.3 |
| | 850 | 0.05 | 1.53 | 0.77 | 0.89 | 2.0 | — | 18.3 |
| | 850 | 0.12 | 1.12 | 0.49 | 1.66 | 2.3 | — | 6.8 |
| | 850 | 0.27 | 0.32 | 0.28 | 3.17 | 0.8 | — | 40.6 |
| | 900 | 0 | 2.97 | 1.34 | 0.10 | 2.2 | 0.90 | 16.8 |
| | 900 | 0.05 | 1.82 | 0.93 | 0.73 | 2.0 | — | 17.7 |
| | 900 | 0.12 | 1.92 | 1.11 | 1.42 | 1.7 | — | 12.8 |
| | 900 | 0.27 | 1.59 | 1.22 | 2.85 | 1.3 | — | 18.3 |
| Ni (20%) on γ-Al$_2$O$_3$ | 800 | 0 | 0.32 | 0.11 | 0.01 | 2.8 | 0.90 | — |
| | 800 | 0.13 | 1.75 | 2.18 | 0.48 | 0.8 | — | 15.9 |
| | 800 | 0.28 | 2.50 | 4.94 | 0.48 | 0.5 | — | 35.8 |
| | 850 | 0 | 0.49 | 0.18 | 0.01 | 2.7 | 1.0 | — |
| | 850 | 0.13 | 2.09 | 2.51 | 0.35 | 0.8 | — | 14.0 |
| | 850 | 0.28 | 2.86 | 3.28 | 0.24 | 1.3 | — | 42.1 |
| | 900 | 0 | 0.93 | 0.31 | 0.00 | 3.0 | 1.0 | 2.1 |
| Ni (40%) on γ-Al$_2$O$_3$ | 900 | 0.13 | 2.07 | 2.54 | 0.26 | 0.8 | — | 12.4 |
| | 900 | 0.27 | 2.59 | 4.69 | 0.24 | 0.6 | — | 37.0 |
| | 800 | 0 | 0.89 | 0.41 | 0.00 | 2.2 | 1.0 | 8.4 |
| | 800 | 0.14 | 3.97 | 5.11 | 0.29 | 0.8 | — | 29.3 |
| | 800 | 0.29 | 4.71 | 7.62 | 0.45 | 0.6 | — | 35.6 |
| | 800 | 0.43 | 4.95 | 9.14 | 0.64 | 0.5 | — | 43.7 |
| | 850 | 0 | 1.46 | 0.72 | 0.01 | 2.0 | 1.0 | 11.5 |
| | 850 | 0.14 | 3.94 | 5.50 | 0.19 | 0.7 | — | 27.3 |
| | 850 | 0.29 | 4.87 | 8.35 | 0.20 | 0.6 | — | 31.0 |
| | 850 | 0.43 | 5.46 | 9.40 | 0.25 | 0.6 | — | 47.8 |
| | 900 | 0 | 2.34 | 1.31 | 0.01 | 1.8 | 1.0 | 13.9 |
| | 900 | 0.14 | 4.30 | 5.10 | 0.24 | 0.8 | — | 29.4 |
| | 900 | 0.28 | 4.89 | 7.70 | 0.21 | 0.6 | — | 38.0 |
| | 900 | 0.43 | 5.08 | 10.29 | 0.27 | 0.5 | — | 46.6 |
| Ni (20%) on La$_2$O$_3$ | 800 | 0 | 2.23 | 1.34 | 0.01 | 1.7 | 1.0 | 2.2 |
| | 800 | 0.09 | 2.52 | 2.81 | 0.41 | 0.9 | — | 19.6 |
| | 800 | 0.17 | 2.70 | 3.78 | 0.59 | 0.7 | — | 25.4 |
| | 800 | 0.21 | 2.75 | 4.72 | 0.69 | 0.6 | — | 33.9 |
| | 850 | 0 | 2.62 | 1.74 | 0.01 | 1.5 | 1.0 | 10.6 |
| | 850 | 0.09 | 2.63 | 3.15 | 0.26 | 0.8 | — | 23.7 |
| | 850 | 0.17 | 2.78 | 4.18 | 0.37 | 0.6 | — | 30.4 |
| | 850 | 0.21 | 2.58 | 5.14 | 0.29 | 0.5 | — | 40.2 |

TABLE 4-continued

Summary of Results Obtained for Supported Catalysts on $Sr_{1.6}La_{0.4}GaFeO_{5.2}$ Membrane Disk Reactors

| Catalyst Composition | Temperature (° C) | Feed $CO_2:CH_4$ | $H_2$ | CO | Product $CO_2$ ml/min cm$^2$ | $H_2:CO$ | CO Selectivity | Carbon Deposition |
|---|---|---|---|---|---|---|---|---|
| Ni (20%) on $La_2O_3$ | 900 | 0 | 2.61 | 2.49 | 0.00 | 1.1 | 1.0 | 25.2 |
| | 900 | 0.09 | 2.59 | 3.56 | 0.15 | 0.7 | — | 28.1 |
| | 900 | 0.17 | 2.56 | 4.73 | 0.14 | 0.5 | — | 34.7 |
| | 900 | 0.21 | 2.67 | 5.63 | 0.14 | 0.5 | — | 44.3 |
| Ni (20%) on LSM | 800 | 0 | 2.83 | 1.75 | 0.02 | 1.6 | 1.0 | 15.5 |
| | 800 | 0.11 | 2.75 | 3.49 | 0.78 | 0.8 | — | 14.5 |
| | 800 | 0.22 | 2.85 | 3.52 | 1.81 | 0.8 | — | 24.8 |
| | 850 | 0 | 3.30 | 2.40 | 0.01 | 1.4 | 1.0 | 21.5 |
| | 850 | 0.11 | 3.20 | 4.89 | 0.12 | 0.7 | — | 26.5 |
| | 850 | 0.22 | 3.21 | 4.50 | 1.28 | 0.7 | — | 31.1 |
| | 900 | 0 | 3.42 | 3.10 | 0.01 | 1.1 | 1.0 | 24.3 |
| | 900 | 0.11 | 2.99 | 5.46 | 0.06 | 0.5 | — | 29.0 |
| | 900 | 0.22 | 3.28 | 5.39 | 0.87 | 0.6 | — | 40.6 |
| Ni (40%) on LSM | 800 | 0 | 1.15 | 0.41 | 0.00 | 2.8 | 1.0 | 4.40 |
| | 800 | 0.10 | 2.26 | 1.93 | 0.55 | 1.2 | — | 12.3 |
| | 800 | 0.14 | 1.51 | 1.76 | 1.26 | 0.9 | — | 12.0 |
| | 800 | 0.22 | 1.23 | 1.80 | 2.08 | 0.7 | — | 6.50 |
| | 850 | 0 | 1.69 | 0.74 | 0.00 | 2.3 | 1.0 | 8.9 |
| | 850 | 0.10 | 3.56 | 2.97 | 0.32 | 1.2 | — | 10.3 |
| | 850 | 0.14 | 2.34 | 2.71 | 0.74 | 0.9 | — | 14.5 |
| Ni (40%) on LSM | 850 | 0.22 | 2.19 | 2.76 | 1.44 | 0.8 | — | 9.3 |
| | 900 | 0 | 2.89 | 1.19 | 0.01 | 2.4 | 1.0 | 12.6 |
| | 900 | 0.10 | 4.13 | 2.95 | 0.19 | 1.4 | — | 21.0 |
| | 900 | 0.14 | 3.29 | 3.59 | 0.38 | 0.9 | — | 17.1 |
| | 900 | 0.22 | 3.39 | 4.19 | 0.77 | 0.8 | — | 15.3 |
| Ni (20%) on LSCr | 800 | 0 | 0.23 | 0.11 | 0.00 | 2.1 | 1.0 | 2.7 |
| | 800 | 0.07 | 1.29 | 0.83 | 1.13 | 1.6 | — | 18.5 |
| | 800 | 0.12 | 1.50 | 1.13 | 1.67 | 1.3 | — | 15.2 |
| | 800 | 0.17 | 1.77 | 1.52 | 2.35 | 1.2 | — | 16.1 |
| | 850 | 0 | 0.42 | 0.22 | 0.00 | 1.9 | 1.0 | 3.6 |
| | 850 | 0.07 | 1.44 | 0.94 | 1.13 | 1.5 | — | 19.4 |
| | 850 | 0.12 | 1.78 | 1.45 | 1.58 | 1.2 | — | 18.5 |
| | 850 | 0.17 | 2.02 | 1.91 | 2.14 | 1.1 | — | 20.6 |
| | 900 | 0 | 0.94 | 0.43 | 0.00 | 2.2 | 1.0 | 5.2 |
| | 900 | 0.07 | 1.59 | 1.10 | 1.13 | 1.4 | — | 18.2 |
| | 900 | 0.12 | 2.06 | 1.68 | 1.52 | 1.2 | — | 20.3 |
| | 900 | 0.17 | 2.31 | 2.10 | 2.11 | 1.1 | — | 20.5 |
| Ni (10%) on $Sr_{1.6}La_{0.4}GaFeO_{5.2}$ | 800 | 0 | 0.02 | 0.01 | 0.79 | 1.9 | 0.0 | 15.6 |
| | 800 | 0.08 | 0.07 | 0.02 | 1.95 | 4.1 | — | 115.6 |
| | 800 | 0.22 | 0.08 | 0.03 | 3.26 | 2.6 | — | 20.2 |
| Ni (10%) on $Sr_{1.6}La_{0.4}GaFeO_{5.2}$ | 850 | 0 | 0.16 | 0.07 | 1.09 | 2.4 | 0.1 | 20.2 |
| | 850 | 0.07 | 0.08 | 0.01 | 2.13 | 11 | — | 6.6 |
| | 850 | 0.14 | 0.10 | 0.01 | 2.63 | 9.3 | — | 11.2 |
| | 850 | 0.22 | 0.08 | 0.03 | 3.50 | 2.7 | — | 19.4 |
| | 900 | 0 | 0.18 | 0.07 | 1.04 | 2.5 | 0.1 | 19.2 |
| | 900 | 0.07 | 0.26 | 0.03 | 2.12 | 8.7 | — | 11.7 |
| | 900 | 0.14 | 0.26 | 0.03 | 2.67 | 8.4 | — | 12.2 |
| | 900 | 0.22 | 0.12 | 0.07 | 3.61 | 2.0 | — | 20.0 |
| Ni (20%) on $Sr_{1.6}La_{0.4}GaFeO_{5.2}$ | 800 | 0 | 0.17 | 0.09 | 0.11 | 1.8 | 0.5 | — |
| | 800 | 0.12 | 0.06 | 0.07 | 1.82 | 0.8 | — | 4.3 |
| | 800 | 0.20 | 0.21 | 0.37 | 3.50 | 0.6 | — | 6.2 |
| | 850 | 0 | 0.37 | 0.20 | 0.21 | 1.9 | 0.5 | — |
| | 850 | 0.08 | 0.68 | 0.68 | 1.48 | 1.0 | — | — |
| | 850 | 0.20 | 0.49 | 0.72 | 3.19 | 0.7 | — | 8.0 |
| | 900 | 0 | 1.34 | 0.69 | 0.07 | 1.9 | 0.9 | 3.4 |
| | 900 | 0.08 | 1.08 | 1.05 | 1.31 | 1.0 | — | 4.7 |
| | 900 | 0.20 | 0.93 | 1.18 | 2.87 | 0.8 | — | 11.8 |
| Ni (40%) on $Sr_{1.6}La_{0.4}GaFeO_{5.2}$ | 800 | 0 | 0.07 | 0.04 | 0.00 | 2.0 | 0.9 | 4.2 |
| Ni (40%) on $Sr_{1.6}La_{0.4}GaFeO_{5.2}$ | 800 | 0.23 | 0.39 | 0.43 | 3.04 | 0.9 | — | 1.3 |
| | 800 | 0.05 | 0.11 | 0.09 | 0.94 | 1.2 | — | — |
| | 800 | 0.16 | 0.35 | 0.37 | 2.51 | 1.0 | — | 2.1 |
| | 850 | 0 | 0.14 | 0.06 | 0.00 | 2.2 | 1.0 | 2.6 |
| | 850 | 0.05 | 0.26 | 0.19 | 0.88 | 1.4 | — | — |
| | 850 | 0.16 | 0.77 | 0.75 | 2.22 | 1.0 | — | 3.1 |
| | 850 | 0.23 | 0.86 | 0.81 | 2.66 | 1.1 | — | 2.7 |
| | 900 | 0 | 0.33 | 0.11 | 0.01 | 2.8 | 0.9 | 3.8 |
| | 900 | 0.05 | 0.47 | 0.32 | 0.79 | 1.5 | — | 1.8 |

TABLE 4-continued

Summary of Results Obtained for Supported Catalysts on $Sr_{1.6}La_{0.4}GaFeO_{5.2}$ Membrane Disk Reactors

| Catalyst Composition | Temperature (° C) | Feed $CO_2$:$CH_4$ | $H_2$ | CO | Product $CO_2$ ml/min cm$^2$ | $H_2$:CO | CO Selectivity | Carbon Deposition |
|---|---|---|---|---|---|---|---|---|
| | 900 | 0.16 | 1.53 | 1.51 | 1.70 | 1.0 | — | 7.1 |
| | 900 | 0.23 | 1.66 | 1.76 | 1.92 | 0.9 | — | 8.0 |
| Ni (20%) on $Sr_{1.6}La_{0.4}MnFeO_{5.2}$ | 800 | 0 | 0.70 | 0.31 | 0.24 | 2.2 | 0.6 | 5 |
| | 800 | 0.08 | 0.58 | 0.28 | 1.16 | 2.0 | — | 8 |
| | 800 | 0.10 | 0.17 | 0.11 | 1.15 | 1.6 | — | — |
| | 850 | 0 | 0.68 | 0.30 | 0.34 | 2.2 | 0.5 | 6 |
| | 850 | 0.08 | 0.51 | 0.30 | 1.56 | 1.7 | — | 10 |
| | 850 | 0.10 | 0.33 | 0.23 | 1.15 | 1.5 | — | — |
| | 900 | 0 | 0.81 | 0.37 | 0.44 | 2.2 | 0.5 | 9 |
| Ni (20%) on $Sr_{1.6}La_{0.4}MnFeO_{5.2}$ | 900 | 0.08 | 0.77 | 0.44 | 1.60 | 1.8 | — | 7 |
| | 900 | 0.10 | 0.57 | 0.42 | 0.88 | 1.3 | — | 4 |
| Rh (5%) on $Sr_{1.6}La_{0.4}GaFeO_{5.2}$ | 800 | 0 | 0.13 | 0.05 | 0.23 | 2.6 | 0.2 | — |
| | 800 | 0.14 | 0.03 | 0.16 | 2.05 | 0.1 | — | — |
| | 800 | 0.20 | 0.13 | 0.36 | 3.17 | 0.3 | — | 6 |
| | 850 | 0 | 0.29 | 0.12 | 0.34 | 2.5 | 0.3 | — |
| | 850 | 0.08 | 0.16 | 0.23 | 1.30 | 0.7 | — | 5 |
| | 850 | 0.14 | 0.12 | 0.28 | 1.97 | 0.4 | — | — |
| | 850 | 0.20 | 0.28 | 0.59 | 2.90 | 0.5 | — | 6 |
| | 900 | 0 | 0.61 | 0.27 | 0.47 | 2.3 | 0.4 | — |
| | 900 | 0.08 | 0.40 | 0.45 | 1.19 | 0.9 | — | 7 |
| | 900 | 0.14 | 0.38 | 0.56 | 1.79 | 0.7 | — | 1 |
| | 900 | 0.20 | 0.55 | 0.89 | 2.55 | 0.6 | — | 7 |
| Rh (5%) on $La_{0.8}Sr_{0.2}MnO_{3-x}$ | 800 | 0 | 0.57 | 0.27 | 0 | 2.1 | 1.0 | 12 |
| | 800 | 0.09 | 0.35 | 0.46 | 1.06 | 0.8 | — | 9 |
| | 800 | 0.14 | 0.67 | 1.10 | 1.48 | 0.6 | — | 10 |
| | 800 | 0.22 | 0.26 | 0.47 | 1.82 | 0.5 | — | — |
| | 850 | 0 | 0.97 | 0.43 | 0 | 2.3 | 1.0 | 16 |
| Rh (5%) on $La_{0.8}Sr_{0.2}MnO_{3-x}$ | 850 | 0.09 | 1.00 | 1.03 | 0.77 | 1.0 | — | 9 |
| | 850 | 0.14 | 1.31 | 1.59 | 1.13 | 0.8 | — | 14 |
| | 850 | 0.22 | 0.72 | 1.12 | 1.60 | 0.6 | — | 3 |
| | 900 | 0 | 1.51 | 0.75 | 0.00 | 2.0 | 1.0 | 9 |
| | 900 | 0.09 | 2.99 | 2.32 | 0.17 | 1.3 | — | 21 |
| | 900 | 0.14 | 2.29 | 2.33 | 0.66 | 1.0 | — | 20 |
| | 900 | 0.22 | 2.08 | 2.28 | 1.00 | 0.9 | — | 10 |
| Rh (5%) on $Al_2O_3$ | 800 | 0 | 3.15 | 2.01 | 0.09 | 1.6 | 1.0 | 16 |
| | 800 | 0.11 | 3.32 | 2.68 | 0.9 | 1.2 | — | 14 |
| | 800 | 0.14 | 2.73 | 2.21 | 0.93 | 1.2 | — | 38 |
| | 850 | 0 | 4.12 | 2.55 | 0.04 | 1.6 | 1.0 | 14 |
| | 850 | 0.11 | 3.81 | 2.84 | 0.81 | 1.3 | — | 21 |
| | 850 | 0.4 | 3.48 | 2.97 | 0.67 | 1.2 | — | 21 |
| | 900 | 0 | 4.81 | 3.15 | 0.02 | 1.5 | 1.0 | 29 |
| | 900 | 0.11 | 4.95 | 4.20 | 0.21 | 1.2 | — | 29 |
| | 900 | 0.14 | 4.24 | 3.77 | 0.45 | 1.1 | — | 27 |

We claim:

1. A process for oxidizing a reactant gas capable of reacting with oxygen which comprises the steps of:

(A) providing a catalytic membrane reactor cell comprising an oxidation zone and a reduction zone separated by a gas-impermeable membrane having a reduction surface and an oxidation surface;

(B) heating said reactor cell to a temperature of from about 300° C. to about 1200° C.;

(C) passing an oxygen-containing gas in contact with the reduction surface of said membrane of said heated reactor in said reduction zone; and (D) providing said reactant gas in contact with the oxidation surface of said membrane of said heated reactor in said oxidation zone;

wherein the membrane comprises:

a reduction surface and an oxidation surface and wherein said membrane comprises a mixed metal oxide material having the general stoichiometry $A_{2-x}A'_xB_{2-y}B'_yO_{5+z}$ where:

A is an alkaline earth metal ion or mixture of alkaline earth metal ions;

A' is a metal ion or mixture of metal ions where the metal is selected from the group consisting of the lanthanide series or is yttrium;

B is a metal ion or mixture of metal ions wherein the metal is selected from the group consisting of 3d transition metals, and the group 13 metals;

B' is a metal ion or mixture of metal ions where the metal is selected from the group consisting of the 3d transition metals, the group 13 metals, the lanthanides and yttrium;

x is a number greater than or equal to 0 and less than or equal to 2;

y is a number greater than or equal to 0 and less than or equal to 2; and z is a number greater than zero and less than one that renders the compound charge neutral.

2. The process of claim 1 wherein the heating temperature of step B ranges from about 600° C. to 1100° C.

3. The process of claim 1 wherein the reactant gas is natural gas or other hydrocarbons.

4. The process of claim 1 wherein the oxygen-containing gas is air or oxygen.

5. A process for separation of oxygen from an oxygen-containing gas which comprises the steps of:

(A) providing a catalytic membrane reactor cell having an oxidation zone and a reduction zone separated by a gas-impermeable membrane having a reduction surface and an oxidation surface;

(B) heating said reactor cell to a temperature of from about 300° C. to about 1200° C.;

(C) passing an oxygen-containing gas in contact with the reduction surface of said membrane of said heated reactor in said reduction zone; and (D) providing for collection of separated oxygen from said oxidation zone;

wherein the membrane comprises a mixed metal oxide material having the general stoichiometry:

$$A_{2-x}A'_xB_{2-y}B'_yO_{5+z}$$

where:
A is an alkaline earth metal ion or mixture of alkaline earth metal ions;

A' is a metal ion or mixture of metal ions where the metal is selected from the group consisting of the lanthanide series or is yttrium;

B is a metal ion or mixture of metal ions wherein the metal is selected from the group consisting of 3d transition metals, and the group 13 metals;

B' is a metal ion or mixture of metal ions where the metal is selected from the group consisting of the 3d transition metals, the group 13 metals, the lanthanides and yttrium;

x is a number greater than or equal to 0 and less than or equal to 2;

y is a number greater than or equal to 0 and less than or equal to 2; and z is a number greater than zero and less than one that renders the compound charge neutral.

6. The process of claim 5 wherein the heating temperature of step B ranges from about 600° to 1100° C.

7. A process for production of synthesis gas which comprises the steps of:

(A) providing a catalytic membrane reactor cell having an oxidation zone and a reduction zone separated by a gas-impermeable membrane having a reduction surface and an oxidation surface;

(B) heating said reactor cell to a temperature of from about 300° C. to about 1200° C.;

(C) passing an oxygen-containing gas in contact with the reduction surface of said membrane of said heated reactor in said reduction zone; and (D) providing methane or a mixture of $CO_2$ and methane in contact with the oxidation surface of said membrane of said heated reactor in said oxidation zone;

wherein the membrane comprises a mixed metal oxide material having the general stoichiometry:

$$A_{2-x}A'_xB_{2-y}B'_yO_{5+z}$$

where:
A is an alkaline earth metal ion or mixture of alkaline earth metal ions;

A' is a metal ion or mixture of metal ions where the metal is selected from the group consisting of the lanthanide series or is yttrium;

B is a metal ion or mixture of metal ions wherein the metal is selected from the group consisting of 3d transition metals, and the group 13 metals;

B' is a metal ion or mixture of metal ions where the metal is selected from the group consisting of the 3d transition metals, the group 13 metals, the lanthanides and yttrium;

x is a number greater than or equal to 0 and less than or equal to 2;

y is a number greater than or equal to 0 and less than or equal to 2; and z is a number greater than zero and less than one that renders the compound charge neutral.

8. The process of claim 7 wherein the membrane comprises a mixed metal oxide selected from the group consisting of $Sr_{1.7}La_{0.3}GaFeO_{5.15}$, $Sr_{1.8}La_{0.2}GaFeO_{5.1}$, $Sr_{1.6}La_{0.4}GaFeO_{5.2}$, $Sr_{1.4}La_{0.6}GaFeO_{5.3}$, $Sr_{1.6}La_{0.4}Ga_{0.2}Fe_{1.8}O_{5.2}$, $Sr_{1.6}La_{0.4}Ga_{0.4}Fe_{1.6}O_{5.2}$, $Sr_{1.6}La_{0.4}Ga_{0.6}Fe_{1.4}O_{5.2}$, $Sr_{1.6}La_{0.4}Ga_{0.8}Fe_{1.2}O_{5.2}$, $Sr_{1.7}La_{0.3}Ga_{0.2}Fe_{1.8}O_{5.15}$, $Sr_{1.7}La_{0.3}Ga_{0.4}Fe_{1.6}O_{5.15}$, $Sr_{1.7}La_{0.3}Ga_{0.6}Fe_{1.4}O_{5.15}$, $Sr_{1.7}La_{0.3}Ga_{0.8}Fe_{1.2}O_{5.15}$, $Sr_{1.8}La_{0.2}Ga_{0.4}Fe_{1.6}O_{5.1}$, $Sr_{1.8}La_{0.2}Ga_{0.6}Fe_{1.4}O_{5.1}$, $Sr_{1.8}La_{0.2}Ga_{0.8}Fe_{1.2}O_{5.1}$, and $Sr_{1.8}La_{0.2}Ga_{0.2}Fe_{1.8}O_{5.1}$.

9. A process for making a gas-impermeable membrane for use in a catalytic membrane reactor which comprises the steps of:

(A) combining metal precursors of the metals A, A', B and B' in the stoichiometry:

$$A_{2-x}A'_xB_{2-y}B'_yO_{5+z}$$

where:
A is an alkaline earth metal ion or mixture of alkaline earth metal ions;

A' is a metal ion or mixture of metal ions where the metal is selected from the group consisting of the lanthanide series or is yttrium;

B is a metal ion or mixture of metal ions wherein the metal is selected from the group consisting of 3d transition metals, and the group 13 metals;

B' is a metal ion or mixture of metal ions where the metal is selected from the group consisting of the 3d transition metals, the group 13 metals, the lanthanides and yttrium;

x is a number greater than or equal to 0 and less than or equal to 2;

y is a number greater than or equal 0 and less than or equal to 2; and z is a number greater than zero and less than one that renders the compound charge neutral to form a homogeneous mixture;

(B) calcining the homogeneous mixture at temperatures up to about 1450° C. for 12 h in atmosphere;

(C) reducing the particle size of the sintered mixture by attrition;

(D) pressing the reduced-particle size mixture into a selected membrane shape; and (E) sintering the pressed shaped membrane at a temperature from about 1300° C. to about 1450° C. for 4 hours in atmosphere to obtain a sintered membrane of greater than or equal to 90% theoretical density.

10. The process according to claim 1 wherein the B metal in the mixed metal oxide is selected from the group Al, Ga, In and mixtures thereof.

11. The process according to claim 1 wherein the A metal in the mixed metal oxide is Sr.

12. The process according to claim 1 wherein the A metal in the mixed metal oxide is Ca.

13. The process according to claim 12 wherein the A' metal in the mixed metal oxide is La.

14. The process according to claim 13 wherein the B metal is Fe.

15. The process according to claim 14 wherein y is 0.

16. The process according to claim 15 wherein $0<x<0.5$.

17. The process according to claim 1 wherein the A' metal in the mixed metal oxide is La or Y.

18. The process according to claim 1 wherein the B' metal in the mixed metal oxide is Fe.

19. The process according to claim 1 wherein the B' metal is Co.

20. The process according to claim 1 wherein the B metal is Al.

21. The process according to claim 1 wherein the B metal is Ga.

22. The process according to claim 1 wherein x is greater than zero.

23. The process according to claim 1 wherein y is greater than zero.

24. The process according to claim 1 wherein the gas-impermeable membrane comprises a mixed metal oxide selected from the group consisting of
$Sr_{1.7}La_{0.3}GaFeO_{5.15}$, $Sr_{1.8}La_{0.2}GaFeO_{5.1}$, $Sr_{1.6}La_{0.4}GaFeO_{5.2}$, $Sr_{1.4}La_{0.6}GaFeO_{5.3}$, $Sr_{1.6}La_{0.4}Ga_{0.2}Fe_{1.8}O_{5.2}$, $Sr_{1.6}La_{0.4}Ga_{0.4}Fe_{1.6}O_{5.2}$, $Sr_{1.6}La_{0.4}Ga_{0.6}Fe_{1.4}O_{5.2}$, $Sr_{1.6}La_{0.4}Ga_{0.8}Fe_{1.2}O_{5.2}$, $Sr_{1.7}La_{0.3}Ga_{0.2}Fe_{1.8}O_{5.15}$, $Sr_{1.7}La_{0.3}Ga_{0.4}Fe_{1.6}O_{5.1}$, $Sr_{1.7}La_{0.3}Ga_{0.6}Fe_{1.4}O_{5.15}$, $Sr_{1.7}La_{0.3}Ga_{0.8}Fe_{1.2}O_{5.15}$, $Sr_{1.8}La_{0.2}Ga_{0.4}Fe_{1.6}O_{O5.1}$, $Sr_{1.8}La_{0.2}Ga_{0.6}Fe_{1.4}O_{5.1}$, $Sr_{1.8}La_{0.2}Ga_{0.8}Fe_{1.2}O_{5.1}$, and $Sr_{1.8}La_{0.2}Fe_{1.8}O_{5.1}$.

25. The process according to claim 1 wherein the mixed metal oxide has the stoichiometry $A_{2-x}La_xB_{2-y}Fe_yO_{5+z}$ where A is Sr, Ba, Ca or mixtures thereof, and B is Al, Ga, In or mixtures thereof.

26. The process of claim 1 wherein the oxygen-containing gas is selected from the group consisting of oxides of carbon, nitrogen and sulfur and mixtures of these oxides with an inert gas or another gas that does not react with the membrane.

27. The process of claim 1 wherein the reactant gas is methane, natural gas or hydrogen.

28. The process of claim 27 wherein steam or $CO_2$ is added to the reactant gas.

29. The process of claim 1 wherein the oxygen-containing gas is flue gas.

30. The process of claim 1 wherein the oxygen-containing gas is selected from the group consisting of NO, $NO_2$, $SO_2$, $S_3$, CO and $CO_2$.

31. The process of claim 1 wherein the reactant gas is selected from the group consisting of unsaturated hydrocarbons, saturated hydrocarbons, and aromatic hydrocarbons.

32. The process of claim 1 wherein the oxygen-containing gas is water.

33. The process of claim 1 wherein the reactant gas is $H_2S$.

34. The process according to claim 5 wherein the B metal in the mixed metal oxide is selected from the group Al, Ga, In and mixtures thereof.

35. The process according to claim 5 wherein the A metal in the mixed metal oxide is Sr.

36. The process according to claim 5 wherein the A metal in the mixed metal oxide is Ca.

37. The process according to claim 36 wherein the A' metal in the mixed metal oxide is La.

38. The process according to claim 37 wherein the B metal is Fe.

39. The process according to claim 38 wherein y is 0.

40. The process according to claim 39 wherein $0<x<0.5$.

41. The process according to claim 5 wherein the A' metal in the mixed metal oxide is La or Y.

42. The process according to claim 5 wherein the B' metal in the mixed metal oxide is Fe.

43. The process according to claim 5 wherein the B' metal is Co.

44. The process according to claim 5 wherein the B metal is Al.

45. The process according to claim 5 wherein the B metal is Ga.

46. The process according to claim 5 wherein x is greater than zero.

47. The process according to claim 5 wherein y is greater than zero.

48. The process according to claim 5 wherein the gas-impermeable membrane comprises a mixed metal oxide selected from the group consisting of
$Sr_{1.7}La_{0.3}GaFeO_{5.15}$, $Sr_{1.8}La_{0.2}GaFeO_{5.1}$, $Sr_{1.6}La_{0.4}GaFeO_{5.2}$, $Sr_{1.4}La_{0.6}GaFeO_{5.3}$, $Sr_{1.6}La_{0.4}Ga_{0.2}Fe_{1.8}O_{5.2}$, $Sr_{1.6}La_{0.4}Ga_{0.4}Fe_{1.6}O_{5.2}$, $Sr_{1.6}La_{0.4}Ga_{0.6}Fe_{1.4}O_{5.2}$, $Sr_{1.6}La_{0.4}Ga_{0.8}Fe_{1.2}O_{5.2}$, $Sr_{1.7}La_{0.3}Ga_{0.2}Fe_{1.8}O_{5.15}$, $Sr_{1.7}La_{0.3}Ga_{0.4}Fe_{1.6}O_{5.15}$, $Sr_{1.7}La_{0.3}Ga_{0.6}Fe_{1.4}O_{5.15}$, $Sr_{1.7}La_{0.3}Ga_{0.8}Fe_{1.2}O_{5.15}$, $Sr_{1.8}La_{0.2}Ga_{0.4}Fe_{1.6}O_{5.1}$, $Sr_{1.8}La_{0.2}Ga_{0.6}Fe_{1.4}O_{5.1}$, $Sr_{1.8}La_{0.2}Ga_{0.8}Fe_{1.2}O_{5.1}$, and $Sr_{1.8}La_{0.2}Ga_{0.2}Fe_{1.8}O_{5.1}$.

49. The process according to claim 5 wherein the oxygen-containing gas is air.

50. The process according to claim 7 wherein the B metal in the mixed metal oxide is selected from the group Al, Ga, In and mixtures thereof.

51. The process of claim 7 wherein the A metal in the mixed metal oxide is Sr, Ca or mixtures thereof.

52. The process according to claim 7 wherein the A metal in the mixed metal oxide is Sr.

53. The process according to claim 7 wherein the A metal is Ca.

54. The process according to claim 53 wherein the A' metal in the mixed metal oxide is La.

55. The process of claim 54 wherein the B metal in the mixed metal oxide is Fe.

56. The process according to claim 55 wherein y is 0.

57. The process according to claim 56 wherein $0<x<0.5$.

58. The process of claim 7 wherein the A' metal in the mixed metal oxide is La, Y or mixtures thereof.

59. The process of claim 7 wherein the B' metal in the mixed metal oxide is Fe.

60. The process of claim 7 wherein the B' metal in the mixed metal oxide is Co.

61. The process of claim 7, wherein x is greater than 0.

62. The process of claim 7 wherein y is greater than 0.

* * * * *

UNITED STATES PATENT AND TRADEMARK OFFICE
CERTIFICATE OF CORRECTION

PATENT NO. : 6,214,757 B1
DATED : April 10, 2001
INVENTOR(S) : Schwartz et al.

It is certified that error appears in the above-identified patent and that said Letters Patent is hereby corrected as shown below:

Title page,
Item [56], References Cited, OTHER PUBLICATIONS,
Page 2, second column, third line, please replace "39" with -- 49 --.
Page 2, second column, after last line please insert -- Cook, R, and Sammells, A.F. (1991) Solid State Ionics, 45:311-321 --.

Column 3,
Line 23, please replace "$La_aSr_bFe_bO_3$" with -- $La_aSr_bFeO_3$ --.
Line 51, please delete "$La_2Sr_{0.8}CoO_3$"
Line 51, please replace "$La_2Sr_{0.8}FeO_3$" with -- $La_{0.2}Sr_{0.8}FeO_3$ --.
Line 52, please replace "$La_{0.2}Sr_{0.8}Fe_8Cr_2O_3$" with -- $La_{0.2}Sr_{0.8}Fe_{0.8}Cr_{0.2}O_3$ --.
Line 53, please replace "$La_{0.2}Sr_{0.8}Fe_{0.8}Cr_{0.1}Co_{0.1}O_{0.3}$" with
-- $La_{0.2}Sr_{0.8}Fe_{0.8}Cr_{0.1}Co_{0.1}O_3$ --.
Line 60, please replace "SC" with -- Sc --.

Column 5,
Line 62, please replace "Mu" with -- Mn --.

Column 8,
Lines 36-37, please replace "component" with -- components --.

Column 10,
Line 16, please replace "$1/20(2\theta)$" with -- $1/2^{\circ} (2\theta)$ --.

Column 11,
Line 29, please replace "$Sr_{1.6}La_{0.4}Ga_{0.4}Fe_{1.2}O_{5.2}$" with -- $Sr_{1.6}La_{0.4}Ga_{0.4}Fe_{1.6}O_{5.2}$ --.

Column 12,
Line 15, after "cylindrical" please insert -- in --.

Column 15,
Approximately line 38, numbered item 3, please replace "$O_{ads+ze+vo}$" with
-- $O_{ads} + 2e^- + V_o$ --.
Line 45, please replace "$t_2$" with -- $t_{2g}$ --.

UNITED STATES PATENT AND TRADEMARK OFFICE
CERTIFICATE OF CORRECTION

PATENT NO. : 6,214,757 B1
DATED : April 10, 2001
INVENTOR(S) : Schwartz et al.

It is certified that error appears in the above-identified patent and that said Letters Patent is hereby corrected as shown below:

Column 17,
Line 57, please replace "an" with -- can --.

Column 18,
Line 19, please replace "2∘(2Θ)" with -- $2°(2\theta)$ --.

Lines 19-20, please replace "0.50∘(2Θ)" with -- $0.5°(2\theta)$ --.

Line 65, please replace "0.5º C.(2Θ)" with -- $0.5°(2\theta)$ --.

Column 24,
Table 2, fifth line of table data, sixth column of table, please replace "15.o" with -- 15.0 --.
Table 2, twenty-eighth line of table data, sixth column of table, please replace 1o.5" with -- 10.5 --.

Column 33,
Table 4, third from last line of table data, third column of table, please replace "0.4" with -- o.14 --.

Column 37,
Line 38, please replace "$Sr_{1.7}La_{0.3}Ga_{0.4}Fe_{1.6}O_{5.1}$" with -- $Sr_{1.7}La_{0.3}Ga_{0.4}Fe_{1.6}O_{5.15}$ --.
Line 40, please replace "$Sr_{1.8}La_{0.2}Ga_{0.4}Fe_{1.6}O_{05.1}$" with -- $Sr_{1.8}La_{0.2}Ga_{0.4}Fe_{1.6}O_{5.1}$ --.
Line 58, please replace "$S_3$" with -- $SO_3$ --.

Signed and Sealed this

Thirtieth Day of July, 2002

*Attest:*

*Attesting Officer*

JAMES E. ROGAN
*Director of the United States Patent and Trademark Office*